US010445087B2

(12) United States Patent
Sato

(10) Patent No.: US 10,445,087 B2
(45) Date of Patent: Oct. 15, 2019

(54) COMMUNICATION SYSTEM AND METHOD

(71) Applicant: FUJITSU LIMITED, Kawasaki-shi, Kanagawa (JP)

(72) Inventor: Fuyuta Sato, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/058,182

(22) Filed: Aug. 8, 2018

(65) Prior Publication Data

US 2019/0056927 A1 Feb. 21, 2019

(30) Foreign Application Priority Data

Aug. 15, 2017 (JP) ................................ 2017-156855

(51) Int. Cl.
| | |
|---|---|
| *G06F 8/65* | (2018.01) |
| *H04L 29/08* | (2006.01) |
| *H04L 29/06* | (2006.01) |
| *G06F 8/654* | (2018.01) |
| *H04W 84/20* | (2009.01) |

(52) U.S. Cl.
CPC ................ *G06F 8/65* (2013.01); *G06F 8/654* (2018.02); *H04L 67/12* (2013.01); *H04L 67/34* (2013.01); *H04L 69/24* (2013.01); *H04W 84/20* (2013.01)

(58) Field of Classification Search
CPC ....................................................... G06F 8/65
USPC ........................................................ 717/172
See application file for complete search history.

(56) References Cited

U.S. PATENT DOCUMENTS

| | | | | |
|---|---|---|---|---|
| 8,891,588 | B1* | 11/2014 | Hui | H04L 45/48 375/133 |
| 9,210,608 | B2* | 12/2015 | Nakaya | H04W 28/0236 |
| 2009/0034419 | A1* | 2/2009 | Flammer, III | H04L 45/124 370/238 |
| 2012/0155253 | A1* | 6/2012 | Johansen | H04L 45/00 370/228 |
| 2012/0275343 | A1* | 11/2012 | Shorty | H04L 12/10 370/255 |

(Continued)

FOREIGN PATENT DOCUMENTS

| | | |
|---|---|---|
| JP | 2008-306314 A | 12/2008 |
| JP | 2011-061681 A | 3/2011 |

(Continued)

*Primary Examiner* — Qing Chen
*Assistant Examiner* — Clint Thatcher
(74) *Attorney, Agent, or Firm* — Fujitsu Patent Center

(57) ABSTRACT

A communication system includes a first node and a second node, the first node is configured to obtain first information indicating reachability of data to the second node, specify a number of frames when transmitting, to the second node, a file to be used for updating of software at the second node, specify, based on the first information and the number of frames, a transmission method candidate to transmit the file, and notify the second node of the specified transmission method candidate, the second processor is configured to, generate updating information indicating whether the software can be updated based on the file to be transmitted by the transmission method candidate, and notify the first node of the updating information, the first processor is configured to, specify a transmission method of the file, based on the updating information, transmit the file to the second node by using the specified transmission method.

18 Claims, 24 Drawing Sheets

(56) References Cited

U.S. PATENT DOCUMENTS

| | | | |
|---|---|---|---|
| 2013/0009751 A1 | 1/2013 | Sato et al. | |
| 2013/0121335 A1* | 5/2013 | Hui | H04L 12/18 370/390 |
| 2014/0247821 A1* | 9/2014 | Yamada | H04W 40/125 370/338 |
| 2015/0043384 A1* | 2/2015 | Hui | H04L 41/12 370/255 |
| 2015/0116128 A1* | 4/2015 | Hald | H04Q 9/14 340/870.02 |
| 2019/0171438 A1* | 6/2019 | Franchitti | G06F 8/65 |

FOREIGN PATENT DOCUMENTS

| | | |
|---|---|---|
| JP | 2013-059125 A | 3/2013 |
| WO | 2011/121671 A1 | 10/2011 |

* cited by examiner

FIG. 9

| SWITCHING TIME | PERIOD | START LEVEL | END LEVEL |
|---|---|---|---|
| X (sec) | Y (sec) | N+1 | N-1 | f0

| RADIO OPERATION LEVEL | NUMBER OF ARRIVALS | REACHABLE NODE |
|---|---|---|
| N+1 | 3 | n1, n2, n3 |
| N | 2 | n1, n2 |
| N-1 | 1 | n1 |

24-1

| RADIO OPERATION LEVEL | NUMBER OF ARRIVALS | REACHABLE NODE |
|---|---|---|
| N+1 | 3 | GW, n2, n3 |
| N | 3 | GW, n2, n3 |
| N-1 | 2 | GW, n2 |

24-2

| RADIO OPERATION LEVEL | NUMBER OF ARRIVALS | REACHABLE NODE |
|---|---|---|
| N+1 | 3 | GW, n1, n3 |
| N | 3 | GW, n1, n3 |
| N-1 | 2 | n1, n3 |

24-3

| RADIO OPERATION LEVEL | NUMBER OF ARRIVALS | REACHABLE NODE |
|---|---|---|
| N+1 | 3 | GW, n1, n2 |
| N | 2 | n1, n2 |
| N-1 | 1 | n2 |

FIG. 13

| NUMBER | REQUIREMENT INFORMATION |
|---|---|
| 1 | COMPLETE DISTRIBUTION WITHIN L HOURS |
| 2 | KEEP POWER CONSUMPTION OF GATEWAY WITHIN M (Wh) |
| 3 | ACHIEVE UPDATE COVERAGE OF P% OR MORE |
| 4 | PRIORITIZE UPDATES OF SPECIFIC SENSOR NODES A, B, AND C |
| 5 | MINIMIZE RADIO INTERFERENCE RATIO |
| 6 | MINIMIZE DISTRIBUTION TIME |

FIG. 15

| NUMBER | RADIO OPERATION LEVEL | FRAME LENGTH | NUMBER OF TRANSMISSION FRAMES | DISTRIBUTION INTERVAL | NUMBER OF HOPS | POWER CONSUMPTION PACE | DISTRIBUTION TIME |
|---|---|---|---|---|---|---|---|
| 1 | N+1 | 30byte | 200 | 10sec | 1 | 200mWh | 6H |
| 2 | N | 70byte | 86 | 20sec | 2 | 50mWh | 3H |
| 3 | N-1 | 110byte | 6 | 30sec | 3 | 80mWh | 1.5H |

FIG. 16

| NUMBER | DISTRIBUTION METHOD CANDIDATE |
|---|---|
| 1 | BROADCASTING WITHIN ONE HOP AT RADIO OPERATION LEVEL N+1 |
| 2 | BROADCASTING WITHIN TWO HOPS AT RADIO OPERATION LEVEL N |
| 3 | BROADCASTING WITHIN THREE HOPS AT RADIO OPERATION LEVEL N-1 |

| UPDATE VERSION NUMBER | UPDATE SIZE | RADIO OPERATION LEVEL | FRAME LENGTH | NUMBER OF TRANSMISSION FRAMES | DISTRIBUTION INTERVAL | NUMBER OF HOPS | POWER CONSUMPTION PACE | DISTRIBUTION TIME |
|---|---|---|---|---|---|---|---|---|
| 02 | 6000byte | N+1 | 30byte | 200 | 10sec | 1 | 20mWh | 6H |

| REMAINING BATTERY POWER | OPERATING POWER CONSUMPTION |
|---|---|
| 500mWh | 30mWh |

| RADIO OPERATION LEVEL | POWER GENERATION PACE |
|---|---|
| N+1 | 30mWh |
| N | 20mWh |
| N-1 | 10mWh |

25-1

| REMAINING BATTERY POWER | OPERATING POWER CONSUMPTION |
|---|---|
| 300mWh | 30mWh |

| RADIO OPERATION LEVEL | POWER GENERATION PACE |
|---|---|
| N+1 | 25mWh |
| N | 15mWh |
| N-1 | 10mWh |

25-2

| REMAINING BATTERY POWER | OPERATING POWER CONSUMPTION |
|---|---|
| 600mWh | 30mWh |

| RADIO OPERATION LEVEL | POWER GENERATION PACE |
|---|---|
| N+1 | 35mWh |
| N | 20mWh |
| N-1 | 5mWh |

| UPDATE FEASIBILITY | CONDITION ITEM (CONDITION FOR ALLOWING UPDATE) |
|---|---|
| INFEASIBLE | IN t HOURS |

BROADCASTING WITHIN ONE HOP AT RADIO OPERATION LEVEL N+1 (DISTRIBUTION METHOD CANDIDATE #1)

| SENSOR NODE | UPDATE FEASIBILITY | CONDITION ITEM (CONDITION FOR ALLOWING UPDATE) |
|---|---|---|
| n1 (20-1) | FEASIBLE | – |
| n2 (20-2) | INFEASIBLE | IN ONE HOUR |
| n3 (20-3) | INFEASIBLE | – |

19b

BROADCASTING WITHIN TWO HOPS AT RADIO OPERATION LEVEL N (DISTRIBUTION METHOD CANDIDATE #2)

| SENSOR NODE | UPDATE FEASIBILITY | CONDITION ITEM (CONDITION FOR ALLOWING UPDATE) |
|---|---|---|
| n1 (20-1) | FEASIBLE | – |
| n2 (20-2) | INFEASIBLE | IN TWO HOURS |
| n3 (20-3) | FEASIBLE | – |

19c

BROADCASTING WITHIN THREE HOPS AT RADIO OPERATION LEVEL N-1 (DISTRIBUTION METHOD CANDIDATE #3)

| SENSOR NODE | UPDATE FEASIBILITY | CONDITION ITEM (CONDITION FOR ALLOWING UPDATE) |
|---|---|---|
| n1 (20-1) | FEASIBLE | – |
| n2 (20-2) | INFEASIBLE | IN THREE HOURS |
| n3 (20-3) | FEASIBLE | – |

FIG. 23

BROADCASTING WITHIN ONE HOP AT RADIO OPERATION LEVEL N (19-1)

| SENSOR NODE | UPDATE FEASIBILITY | CONDITION ITEM (CONDITION FOR ALLOWING UPDATE) |
|---|---|---|
| n1 | FEASIBLE | — |
| n2 | FEASIBLE | — |
| n3 | FEASIBLE | — |
| n4 | FEASIBLE | — |
| n5 | FEASIBLE | — |
| n6 | FEASIBLE | — |
| n7 | FEASIBLE | — |
| n8 | FEASIBLE | — |
| n9 | FEASIBLE | — |
| nA | FEASIBLE | — |
| nB | INFEASIBLE | TRANSMISSION FROM nA, n1, n2, n7, n9, nC, OR nD |
| nC | INFEASIBLE | TRANSMISSION FROM nA, n1, n2, n9, nB, OR nD |
| nD | INFEASIBLE | TRANSMISSION FROM nA, n1, n2, n9, nB, OR nC |
| nE | INFEASIBLE | TRANSMISSION FROM nA, n3, n9, nD, OR nF |
| nF | INFEASIBLE | TRANSMISSION FROM nA, n1, n3, n4, n8, OR nE |

COMMUNICATION SYSTEM AND METHOD

CROSS-REFERENCE TO RELATED APPLICATION

This application is based upon and claims the benefit of priority of the prior Japanese Patent Application No. 2017-156855, filed on Aug. 15, 2017, the entire contents of which are incorporated herein by reference.

FIELD

The embodiments discussed herein are related to a communication system and a method.

BACKGROUND

Service using the Internet of Things (IoT) has become widespread and been expanding these days, in which sensor devices having communication functions are remotely monitored and controlled, and a server collects and utilizes data measured by the sensor devices.

A typical example of the IoT service is a smart grid. The smart grid is a system in which a smart meter placed at each location measures the amount of electricity used at the location, and a server centrally manages power consumption by collecting the amounts of electricity used transmitted from the smart meters.

Meanwhile, the maintenance of the sensor devices involves updating firmware (or software) to cause the sensor devices to operate. In this case, the server transmits the firmware to the sensor devices, and the sensor devices that have received the firmware individually update their own firmware. Prior art documents include International Publication Pamphlet No. WO 2011/121671 and Japanese Laid-open Patent Publication No. 2008-306314.

SUMMARY

According to an aspect of the invention, a communication system includes a first node including a first memory and a first processor coupled to the first memory, and a second node including a second memory and a second processor coupled to the second memory, wherein the first processor is configured to obtain first information indicating reachability of data to the second node in a case of transmitting the data to the second node, specify a number of frames in a case of transmitting, to the second node, a file to be used for updating of software at the second node, specify, based on the first information and the number of frames, a transmission method candidate to transmit the file from the first node to the second node, and notify the second node of the specified transmission method candidate, the second processor is configured to, generate updating information indicating whether the software can be updated based on the file to be transmitted by the transmission method candidate, the first processor is configured to, specify a transmission method of the file from the transmission method candidate, based on the updating information, transmit the file to the second node by using the specified transmission method, and the second processor is configured to execute the updating of the software by using the file transmitted from the first node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a format of a maintenance mode frame.

FIG. 12 is a diagram illustrating a registration example of a reachability information table.

FIG. 13 is a diagram illustrating an example of requirement information.

FIG. 15 is a diagram illustrating an example of a master-side resource information table.

FIG. 16 is a diagram illustrating an example of distribution method candidates.

FIG. 18 is a diagram illustrating an example of a format for an update-feasibility inquiry request.

FIG. 19 is a diagram illustrating an example of slave-side resource information tables.

FIG. 20 is a diagram illustrating an example of an update-feasibility inquiry response.

FIG. 21 is a diagram illustrating an example of an update-feasibility inquiry response table.

FIG. 23 is a diagram illustrating an example of an update-feasibility inquiry response table.

DESCRIPTION OF EMBODIMENTS

To update the firmware of the sensor devices, the data of the firmware is divided to generate frames, which are transferred by flooding control. In the flooding control, a sensor device that has received a frame transmits the same frame once, thereby performing frame relay transfer. This flooding control increases the frame reception rate of the sensor device. However, conventional flooding control increases the amount of radio communication, increasing radio interference and hindering the normal operation of the sensor devices.

First Embodiment

Figure 1:
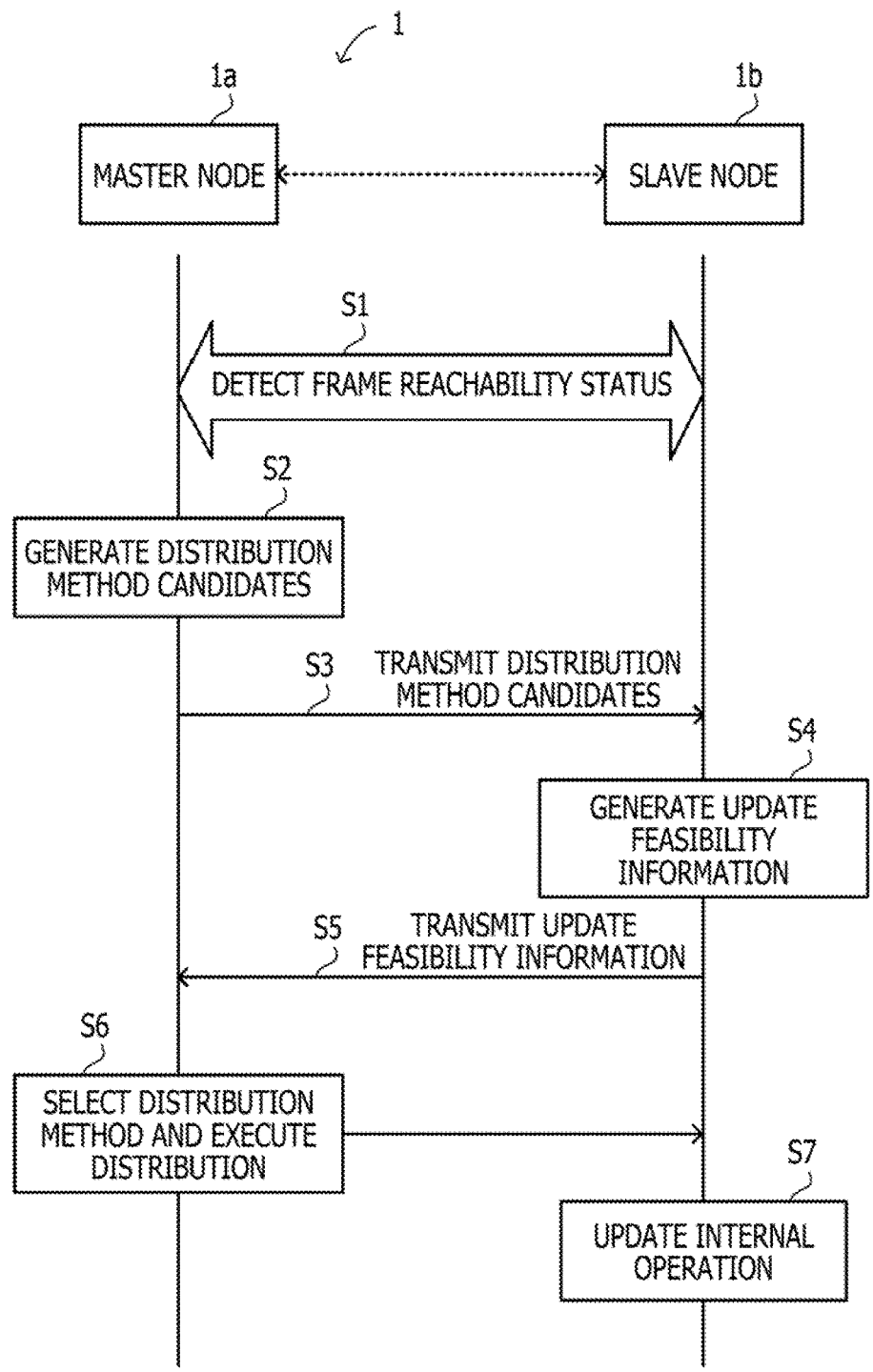
FIG. 1 is a diagram illustrating an example of operation of a distribution control method.

A first embodiment is described with reference to FIG. 1. FIG. 1 is a diagram illustrating an example of operation of a distribution control method. The distribution control method is executed by a communication system 1, which includes a master node 1a and a slave node 1b. The master node 1a and the slave node 1b perform radio communication.

[Step S1] The master node 1a detects the frame reachability status for the case when the master node 1a sends frames to the slave node 1b.

[Step S2] The master node 1a generates frame distribution method candidates based on the frame reachability status and the number of transmission frames.

[Step S3] The master node 1a transmits the distribution method candidates to the slave node 1b.

[Step S4] The slave node 1b determines whether it is feasible to update the internal operation of the slave node 1b using the frames distributed by the distribution method candidates, and the slave node 1b generates update feasibility information.

[Step S5] The slave node 1b transmits the update feasibility information.

[Step S6] The master node 1a selects a frame distribution method out of the distribution method candidates based on the update feasibility information transmitted from the slave node 1b and distributes frames by the selected frame distribution method.

[Step S7] The slave node 1b receives the frames distributed by the selected frame distribution method and updates the internal operation.

As described above, the communication system 1, when updating the internal operation of the slave node 1b, generates the frame distribution method candidates, based on the frame reachability from the master node 1a to the slave node 1b and the number of transmission frames. Then, the communication system 1 selects out of the candidates a frame distribution method that allows the slave node 1b to perform the update.

Distributing frames by the above distribution control method of the communication system 1 makes it possible for the master node 1a to distribute frames for update to the slave node 1b without hindering the operation.

Second Embodiment

Next a second embodiment is described. In the second embodiment, the function of the present disclosure is applied to nodes having a long range (LoRa) communication function for low power wide area network (LPWAN).

The LPWAN enables radio communication for long distance (up to about 20 km) with small power consumption, compared to radio communication such as a mobile phone line and a wireless local area network (LAN). Data communication through an LPWAN makes it possible to construct a network with less power consumption. Meanwhile, LoRa is a communication standard for LPWAN promoted by LoRa Alliance of the United States and is capable of bidirectional communication for both uplink and downlink. LoRa is suitable for battery-driven nodes because of its low power consumption and has features such as performing long-distance radio communication without using relay devices such as repeaters.

Figure 2:
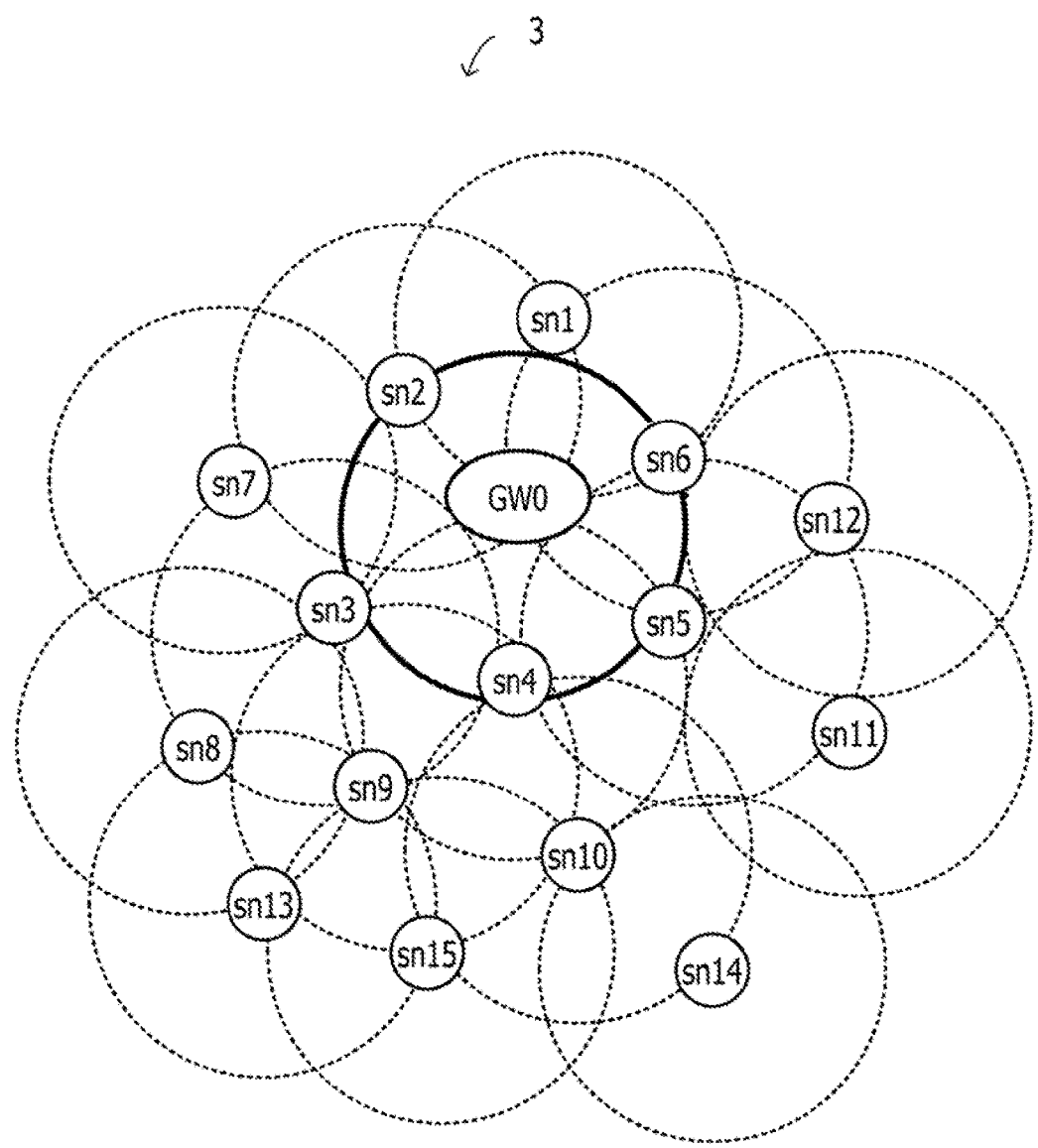
FIG. 2 is a diagram for explaining firmware update by flooding control.

First, description is provided for problems in updating firmware by flooding control with reference to FIG. 2. FIG. 2 is a diagram for explaining the firmware update by flooding control. A communication network 3 includes sensor nodes sn1 to sn15 (referred to as sensor nodes sn when collectively referred to) and a gateway GW0. Note that in FIG. 2, the dotted circles each indicate the communication area of each sensor node, and the thick solid circle indicates the communication area of the gateway GW0.

When the firmware of the sensor nodes sn1 to sn15 is updated, firmware for updating is delivered from the gateway GW0. Since the size of the firmware is generally from several hundred bytes to several Mbytes, it is difficult for the firmware to be hold in one frame (for example, about 1,400 bytes in a wireless LAN). Thus, the firmware is divided into multiple frames (for example, several thousand frames) to be delivered.

In addition, in flooding control, frames into which the firmware is divided by the gateway GW0 are transmitted as broadcast frames, and the sensor node sn that has received frames transmits the same frames only once.

In this operation, even if the sensor node sn does not receives a certain frame due to frame loss or the like, the sensor node sn has other opportunities to receive the frame. Thus, the probability of reception and arrival increases. For example, in the case of FIG. 2, even if the sensor node sn13 was unable to receive a frame transmitted from the sensor node sn9, the sensor node sn13 has opportunities to receive the frame from nearby sensor nodes, such as the sensor node sn8 or the sensor node sn15.

Meanwhile, in multi-hop flooding control as described above, data in the amount of (the number of sensor nodes that receive the frame)×(frame size) appear in the radio network, for a single transmission of a frame. For example, in the example of FIG. 2, the number of broadcastings by the sensor nodes sn is 15 frames per transmission.

Accordingly, the larger the number of transmissions of frames and the number of sensor nodes that receive the frames are, the larger the number of broadcast frames is, causing radio interference and frame losses, and increasing the possibility of failing to receive frames.

In addition, if the situation where a large amount of data remains for a long time in the radio network occurs (broadcast storm), the radio interference causes more frame losses and hinders the operation of the radio network for a long time. This forces the operator to manually update the firmware.

Moreover, since battery-driven sensor nodes sn such as energy harvesting types have become widespread, superseding ones of power feed types, the increase of the number of broadcastings (the number of transmissions and receptions) not only causes radio interference and frame losses but also increases power consumption of the sensor nodes sn, also shortening the lives of the sensor nodes sn.

In light of the above points, the present disclosure is to provide a distribution control method and a communication system capable of delivering frames for updating the firmware with less power consumption of the sensor nodes and without hindering the operation.

Figure 3:
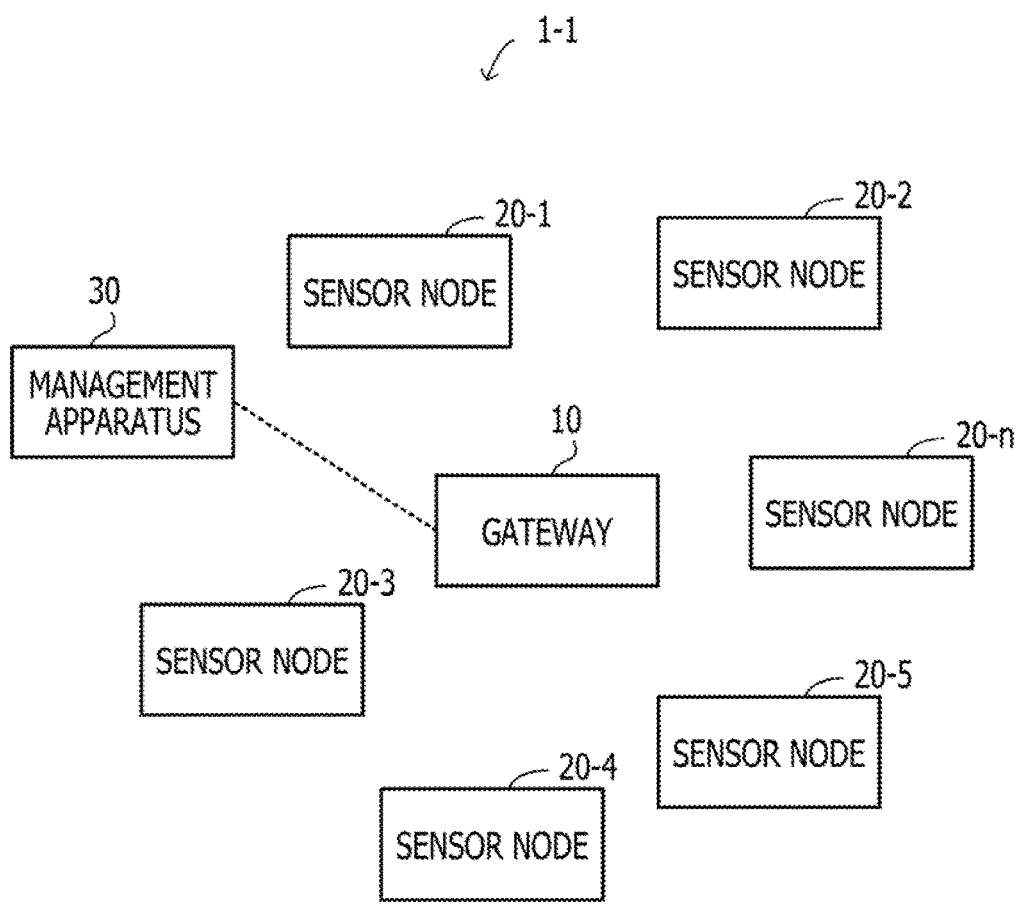
FIG. 3 is a diagram illustrating an example of the configuration of a communication system.

Hereinafter, the second embodiment is described in detail. FIG. 3 is a diagram illustrating an example of the configuration of a communication system. A communication system 1-1 of the second embodiment includes a gateway 10 and multiple sensor nodes 20-1 to 20-*n* (referred to as sensor nodes 20 when collectively referred to).

The gateway 10 has functions that the master node 1*a* illustrated in FIG. 1 has, and the sensor nodes 20-1 to 20-*n* each have functions that the slave node 1*b* illustrated in FIG. 1 has. A management apparatus 30 is coupled to the gateway 10. The operation of the management, apparatus 30 is described later with reference to FIG. 14.

<Hardware Configuration>

Figure 4:
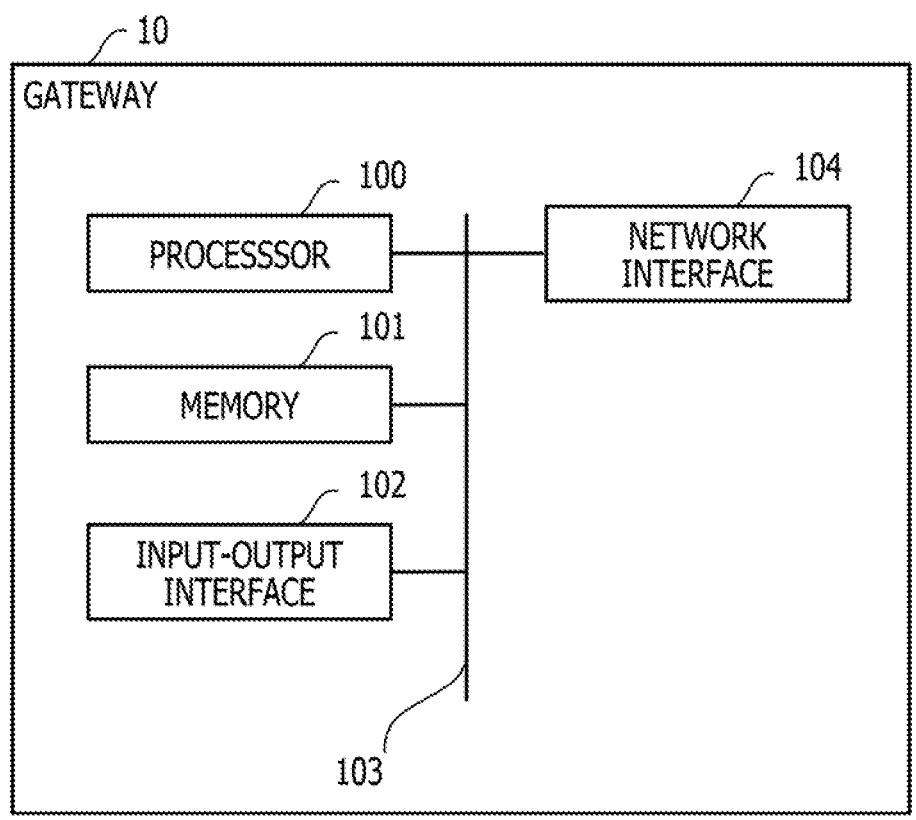
FIG. 4 is a diagram illustrating an example of the hardware configuration of a gateway.

FIG. 4 is a diagram illustrating an example of the hardware configuration of the gateway. The entire device of the gateway 10 is controlled by a processor 100. In other words, the processor 100 functions as the control section of the gateway 10.

Coupled to the processor 100 via a bus 103 is a memory 101 and multiple peripheral devices. The processor 100 may be a multiprocessor. The processor 100 is, for example, a central processing unit (CPU), micro processing unit (MPU), digital signal processor (DSP), application specific integrated circuit (ASIC), or programmable logic device (PLD). The processor 100 may be a combination of two or more of the CPU, MPU, DSP, ASIC, and PLD.

The memory 101 is used as a main storage apparatus of the gateway 10. In the memory 101 is temporarily stored at least part of the program of the operating system (OS) and application programs to be executed by the processor 100. In addition, various data used for processing by the processor 100 are stored in the memory 101.

The memory 101 is also used as an auxiliary storage apparatus of the gateway 10 and stores the program of the OS, application programs, and various data. The memory 101 may include a semiconductor storage apparatus, such as a flash memory and a solid state drive (SSD), or a magnetic recording medium, such as a hard disk drive (HDD), as an auxiliary storage apparatus.

The peripheral devices coupled to the bus 103 include an input-output interface 102 and a network interface 104. Couple to the input-output interface 102 is a monitor (for example, a light emitting diode (LED) display or a liquid crystal display (LCD)) that functions as a display apparatus to display the state of the gateway 10 according to instructions from the processor 100.

The input-output interface 102 may be coupled to information input apparatuses, such as a keyboard and a mouse, and transmits signals from the information input apparatuses to the processor 100.

In addition, the input-output interface 102 also functions as a communication interface for coupling peripheral devices. For example, the input-output interface 102 may be coupled to an optical drive apparatus, which utilizes laser light or the like to read data recorded on optical disks. The optical disk is a portable recording medium on which data is recorded so as to be readable by reflection of light. The optical disks include digital versatile disc (DVD), DVD random access memory (DVD-RAM), CD compact disc read only memory (CD-ROM), and CD-R (recordable)/RW (rewritable).

The input-output interface 102 may also be coupled to a memory apparatus and a memory reader-writer. The memory apparatus is a recording medium having a function of communicating with the input-output interface 102. The memory reader-writer is an apparatus that writes data into a memory card and reads data from a memory card. The memory card is a card type recording medium.

The network interface 104 controls the interface with a network, and for example, a network interface card (NIC) or a wireless LAN card may be used for the network interface 104. Data received by the network interface 104 is outputted to the memory 101 or the processor 100.

The hardware configuration described above provides processing function of the gateway 10. For example, the gateway 10 performs control according to the present disclosure by the processor 100 executing specified programs.

The gateway 10 executes, for example, a program recorded on a computer readable recording medium to perform processing function according to the present disclosure. The program in which processing contents to be executed by the gateway 10 is written may be recorded in various recording media.

For example, the program to be executed by the gateway 10 may be stored in the auxiliary storage apparatus. The processor 100 loads at least part of the program stored in the auxiliary storage apparatus into the main storage apparatus to execute the program.

The program may also be recorded in a portable recording medium, such as an optical disk, memory apparatus, or memory card. The program stored in the portable recording medium becomes executable after, for example, being installed in the auxiliary storage apparatus by the control of the processor 100. Alternatively, the processor 100 may directly read the program from the portable recording medium to execute the program.

Note that although in the above the description has been provided for the hardware configuration of the gateway 10, the same hardware configuration in FIG. 4 is also applied to the sensor node 20.

<Function Block>

Figure 5:
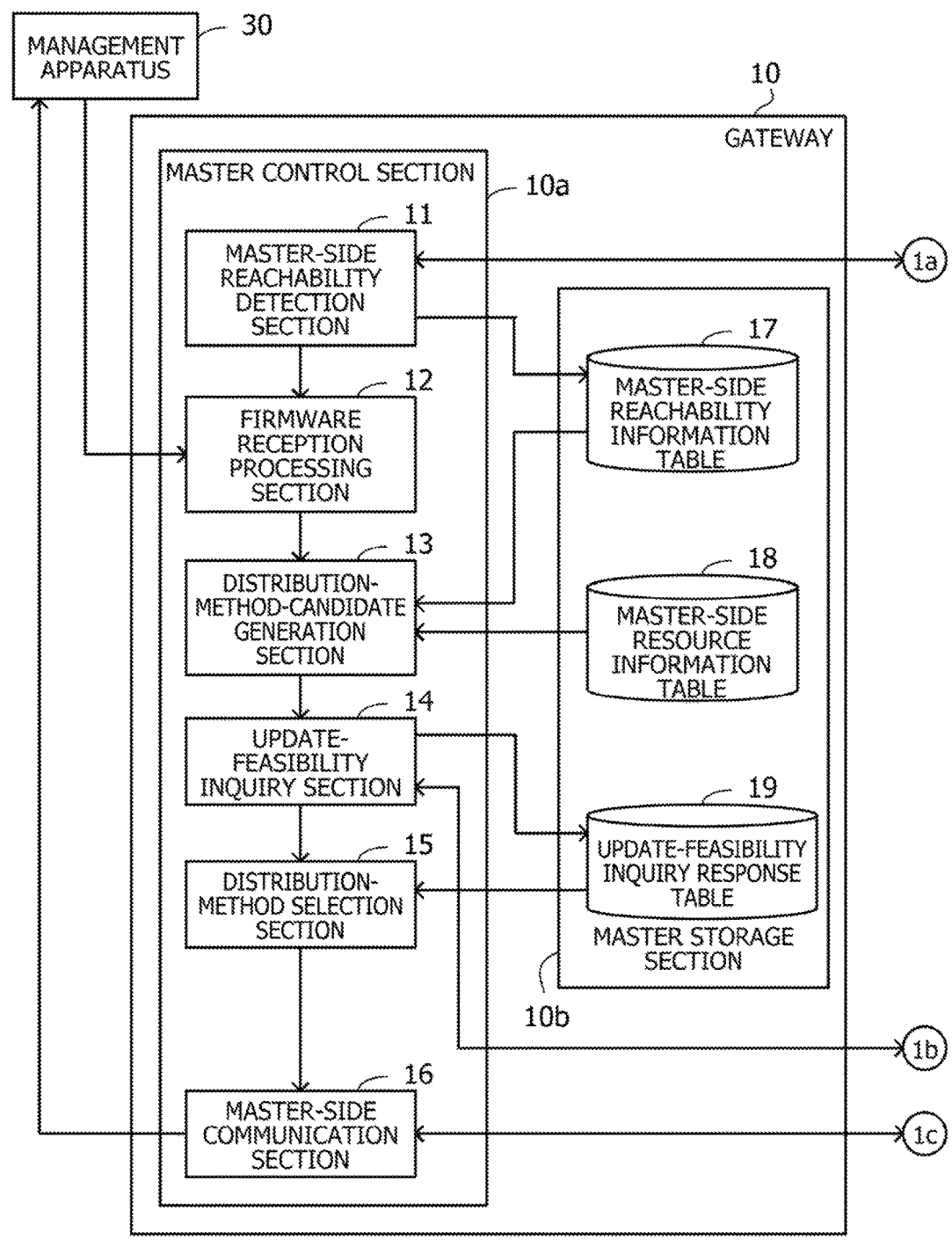
FIG. 5 is a diagram illustrating an example of the function blocks of the gateway.
Figure 6:
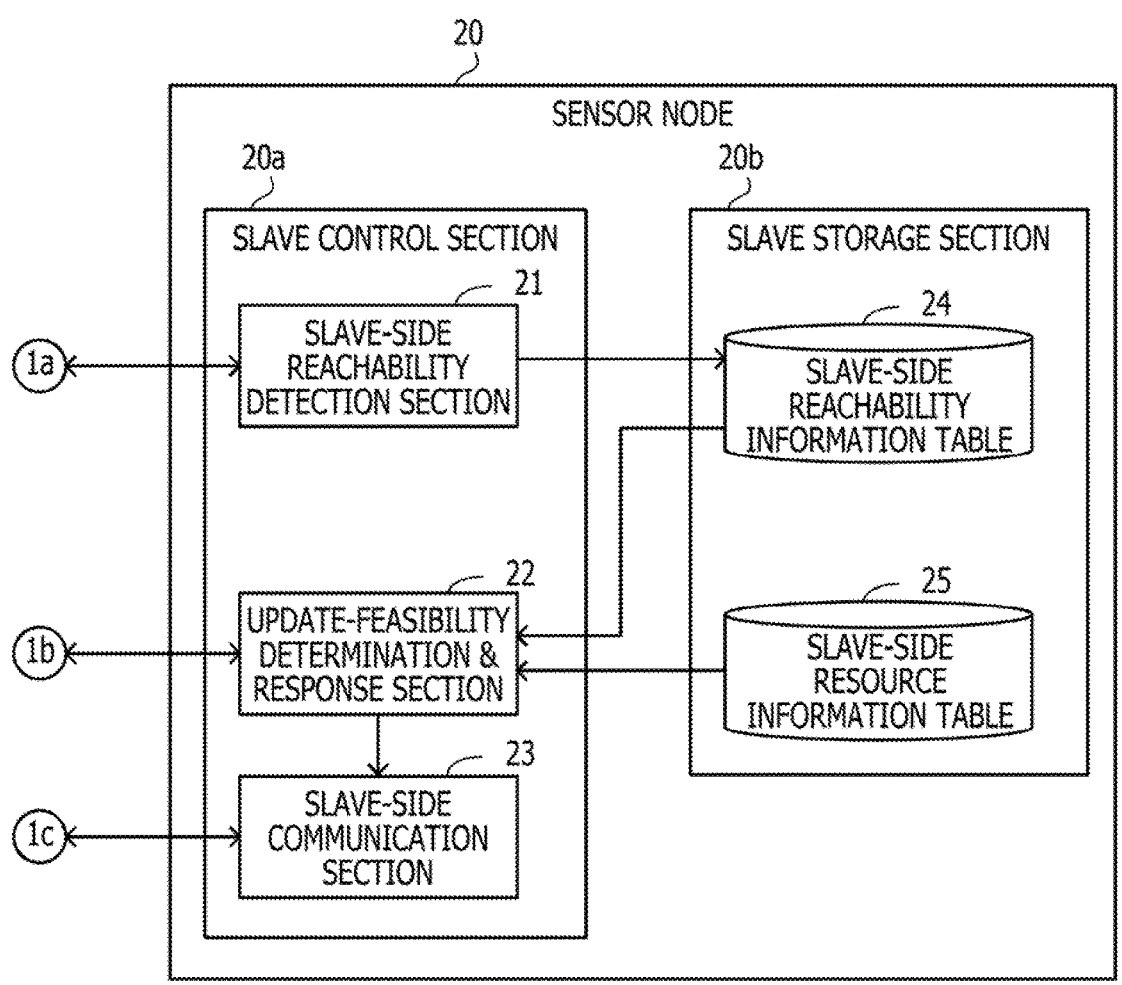
FIG. 6 is a diagram illustrating an example of the function blocks of a sensor node.

Next, description is provided for the function blocks of the gateway 10 and the sensor node 20, with reference to FIGS. 5 and 6. FIG. 5 is a diagram illustrating an example of the function blocks of the gateway. The gateway 10 includes a master control section 10*a* and a master storage section 10*b*.

The master control section 10*a* includes a master-side reachability detection section 11, firmware reception processing section 12, distribution-method-candidate generation section 13, update-feasibility inquiry section 14, distribution-method selection section 15, and master-side communication section 16. The master storage section 10*b* includes a master-side reachability information table 17, master-side resource information table 18, and update-feasibility inquiry response table 19.

The master-side reachability detection section 11 controls the radio operation level to detects the frame reachability to the sensor node 20, which receives firmware. Then, the master-side reachability detection section 11 registers the detected reachability information (frame reachability status information at the gateway 10) in the master-side reachability information table 17.

The firmware reception processing section 12 receives a firmware file transmitted from the management apparatus 30 and performs processing such as calculation of the number of transmission frames from the firmware size.

The distribution-method-candidate generation section 13 generates frame distribution method candidates to update the firmware, based on at least one of the Teachability information, the number of transmission frames, and resource information stored in the master-side resource information table 18.

The update-feasibility inquiry section 14 performs inquiry to check if it is feasible for the sensor node 20 to update the firmware using the generated distribution method candidates. The update-feasibility inquiry section 14 also registers the result of response to the update-feasibility inquiry transmitted from the sensor node 20, in the update-feasibility inquiry response table 19.

The distribution-method selection section 15 selects a frame distribution method out of the distribution method candidates, based on the result of the response to the update-feasibility inquiry. The master-side communication section 16 performs communication interface processing in the gateway 10. For example, the master-side communication section 16 distributes firmware by the selected distribution method and also transmits information on the selected distribution method and distribution status to the management apparatus 30 as distribution results.

Note that the registration contents in the master-side reachability information table 17 are described later with reference to FIG. 12; those of the master-side resource information table 18, with reference to FIG. 15; and those of the update-feasibility inquiry response table 19, with reference to FIG. 21.

FIG. 6 is a diagram illustrating an example of the function blocks of the sensor node. The sensor node 20 includes a slave control section 20a and a slave storage section 20b. The slave control section 20a includes a slave-side reachability detection section 21, update-feasibility determination & response section 22, and slave-side communication section 23. The slave storage section 20b includes a slave-side reachability information table 24 and a slave-side resource information table 25.

The slave-side reachability detection section 21 detects the frame reachability for each radio operation level and registers the detected reachability information (information on frame reachability status at the sensor node 20) in the slave-side reachability information table 24.

The update-feasibility determination & response section 22 determines whether it is feasible to update the firmware that controls the internal operation by the distribution method candidates transmitted from the gateway 10, based on at least one of the reachability information and the resource information stored in the slave-side resource information table 25. The slave-side communication section 23 performs communication interface processing in the sensor node 20. For example, the slave-side communication section 23 performs processing to transmit the update feasibility determination result and processing to receive frames distributed.

Note that the registration contents in the slave-side reachability information table 24 are described later with reference to FIG. 12; those of the slave-side resource information table 25, with reference to FIG. 19.

Here, the master control section 10a in FIG. 5 and the slave control section 20a in FIG. 6 are implemented with the processors 100 illustrated in FIG. 4. The master storage section 10b in FIG. 5 and the slave storage section 20b in FIG. 6 are implemented with the memories 101 illustrated in FIG. 4.

Alternatively, each section may be configured using a hardware circuit, such as a logic circuit.

<Operation Sequence of Communication System>

Figure 7:
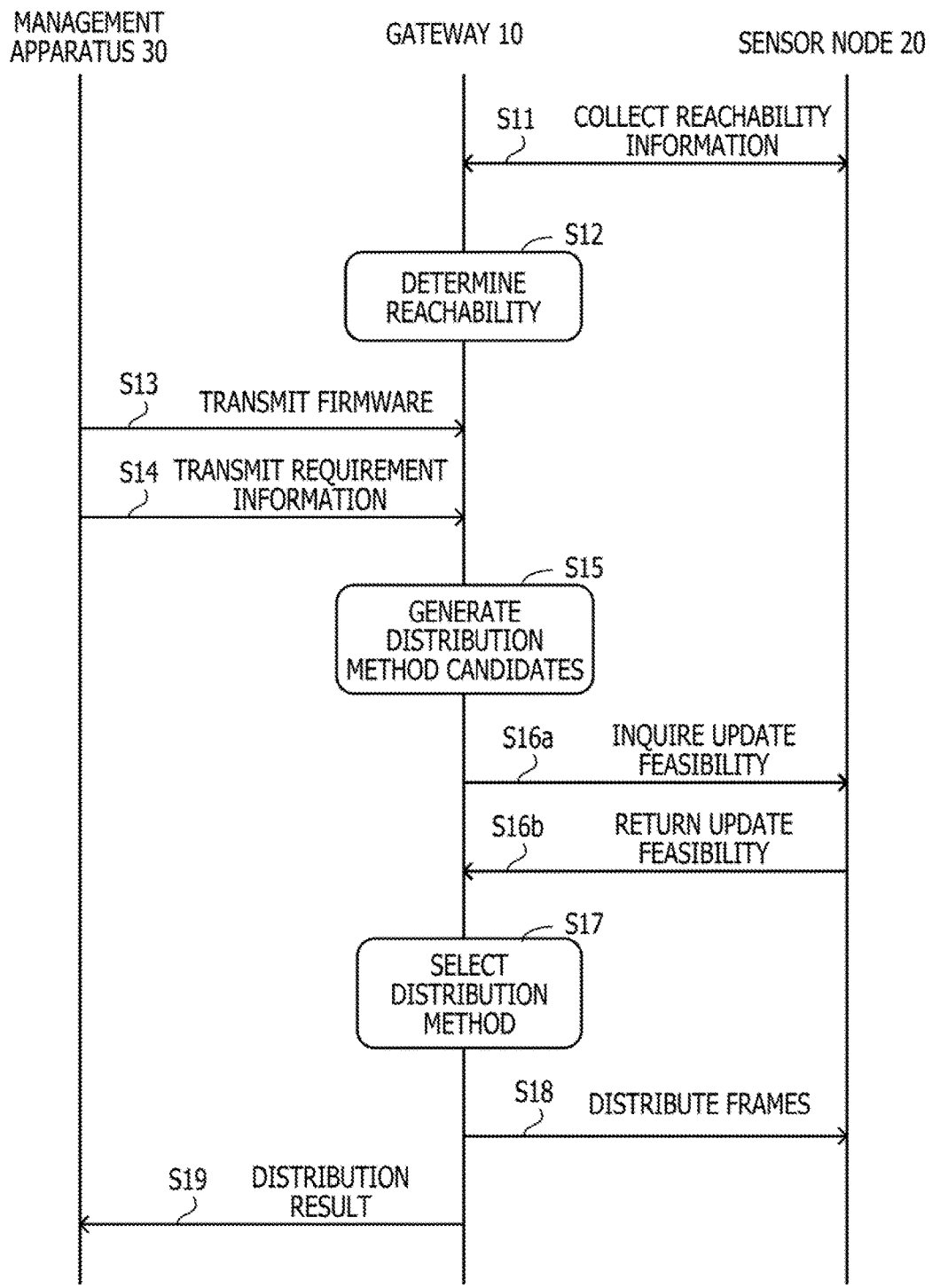
FIG. 7 is a diagram illustrating an example of an operation sequence of the communication system.

FIG. 7 is a diagram illustrating an example of an operation sequence of the communication system. FIG. 7 illustrates the sequence of overall operation of the communication system 1-1.

[Step S11] The gateway 10, in normal operation, accesses the sensor node 20 periodically to collect the reachability information for each radio operation level.

[Step S12] The gateway 10 determines the reachability of the sensor node 20 based on the collected reachability information.

[Step S13] The management apparatus 30 transmits firmware, which is received by the gateway 10.

[Step S14] The management apparatus 30 transmits requirement information to the gateway 10.

[Step S15] The gateway 10 estimates resource consumption for distribution based on the number of transmission frames calculated from the firmware size and the collected reachability information for each radio operation level, and the gateway 10 generates multiple frame distribution method candidates according to the requirement information.

[Step S16a] The gateway 10 inquires of the sensor node 20 update feasibility with the generated distribution method candidates.

[Step S16b] The sensor node 20 determines the update feasibility (determines whether it is feasible to receive firmware) based on expected power consumption including the remaining battery power and returns the determination result. At this time, if the sensor node 20 is unable to receive all the frames, the sensor node 20 adds conditions that enable the sensor node 20 to receive all the frames to the response, which the sensor node 20 returns (this is described later).

[Step S17] The gateway 10 selects a frame distribution method out of the distribution method candidates, based on the update feasibility determination result.

[Step S18] The gateway 10 distributes frames to the sensor node 20 by the selected distribution method.

[Step S19] The gateway 10 transmits information on the selected distribution method and distribution status to the management apparatus 30 as the distribution result.

<Reachability Detection>

Figure 8:
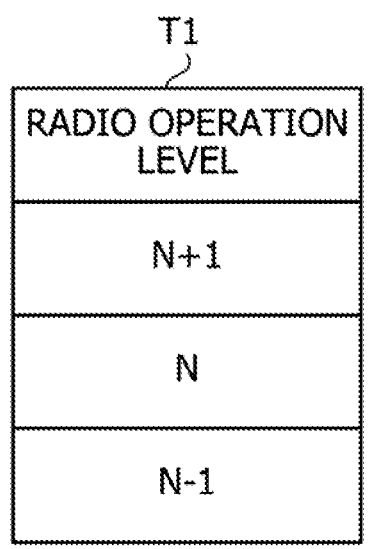
FIG. 8 is a diagram illustrating an example of radio operation levels.

Next, description is provided for operation of the reachability detection, with reference to FIGS. 8 to 12. FIG. 8 is a diagram illustrating an example of radio operation levels. It is assumed that the gateway 10 and the sensor node 20 have, for example, three radio operation levels (LoRa radio operation levels) as illustrated in Table T1. The gateway 10 and the sensor node 20 emit radio waves with an intensity according to the radio operation levels.

For example, assuming the radio operation level N is the reference operation level, the communication range (reaching range) of the operation at the radio operation level N+1 is larger than at the radio operation level N, and the communication range of the operation at the radio operation level N−1 is smaller than at the radio operation level N.

FIG. 9 is a diagram illustrating an example of a format of a maintenance mode frame. When performing the reachability detection, the gateway 10 transmits a maintenance mode frame f0 to the sensor node 20 periodically in the normal operation to set the communication with the sensor node 20 into a maintenance mode.

Set in the maintenance mode frame f0 are a switching time, period, start level and end level. The switching time indicates the time from when the maintenance mode frame f0 is received by the sensor node 20 to when the radio operation level is switched.

The period indicates a period for which the operation at a radio operation level after the switching continues. The start level indicates the radio operation level at the start of switching. The end level indicates the radio operation level at the end of switching.

For example, assume that the sensor node 20 receives a maintenance mode frame f0 in which switching time=60 sec, period=30 sec, start level=N+1, and end level=N−1. In this case, 60 seconds after the sensor node 20 receives the maintenance mode frame f0, the sensor node 20 switches the radio operation level into N+1, which is the start level. Then, when 30 seconds have passed after the radio operation level is switched into N+1, the sensor node 20 switches the radio operation level into N. Further, when another 30 seconds have passed after the radio operation level is switched into N, the sensor node 20 switches the radio operation level into N−1, which is the end level.

Figure 10:
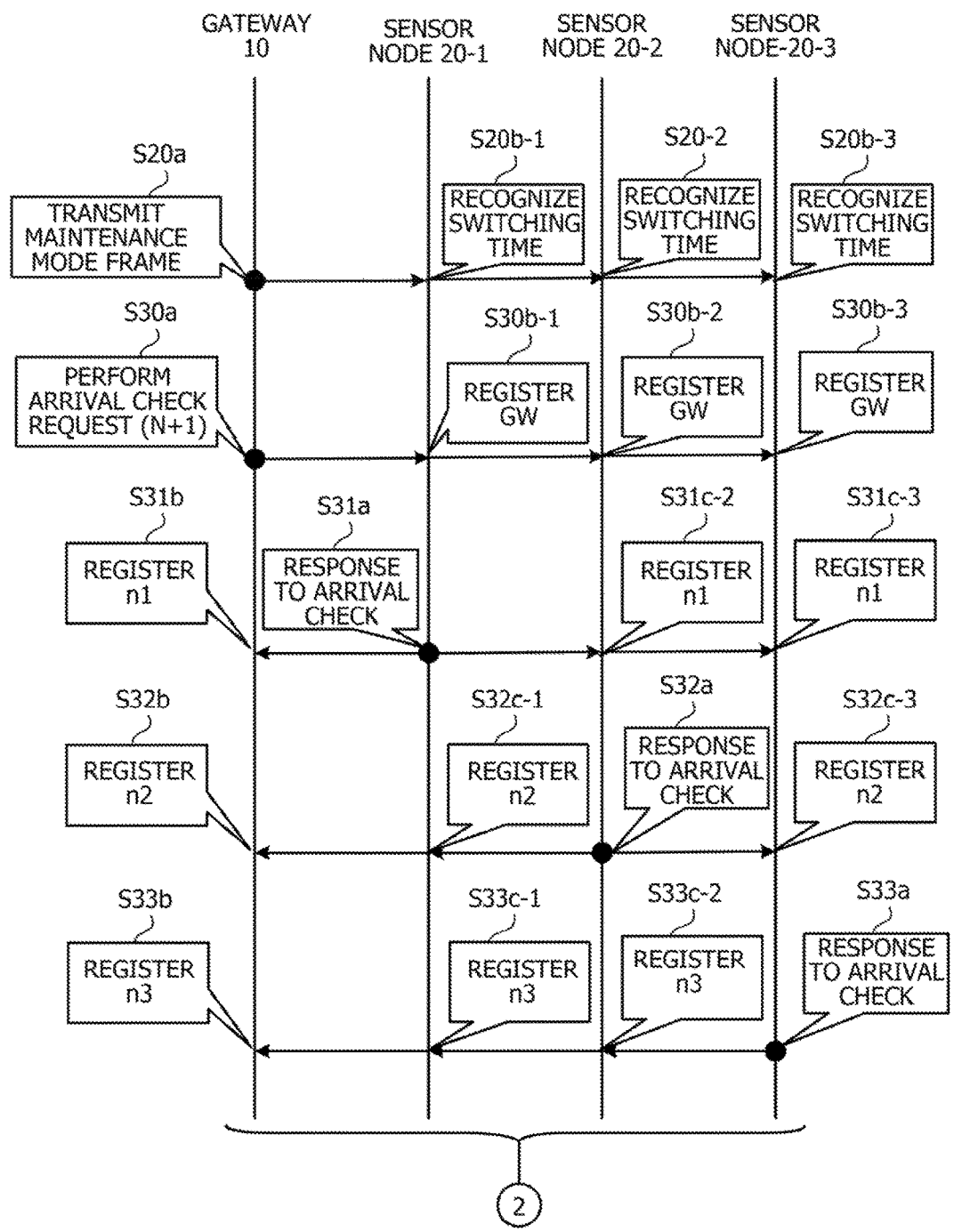
FIG. 10 is a diagram illustrating an example of an operation sequence of reachability detection.
Figure 11:
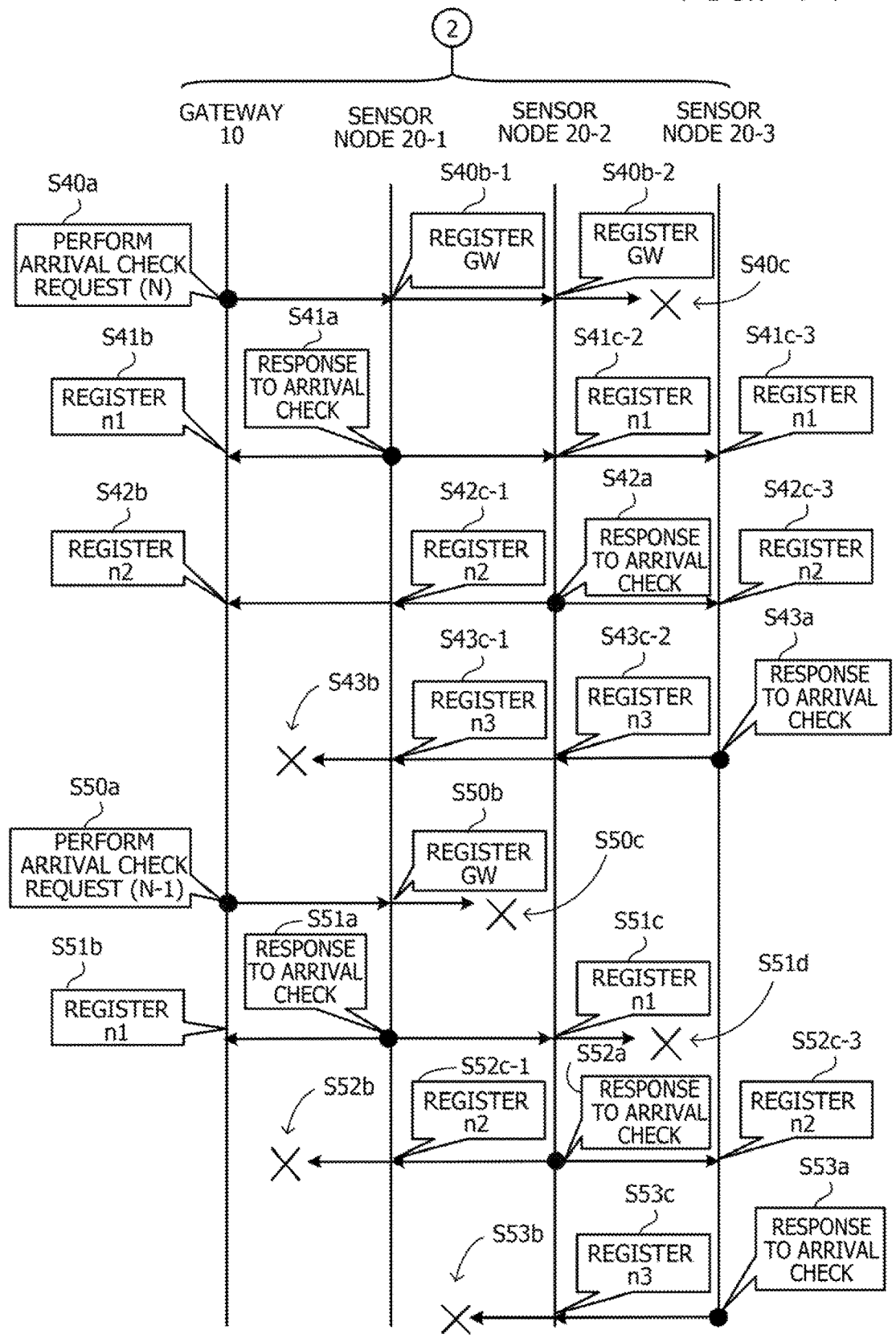
FIG. 11 is a diagram illustrating an example of the operation sequence of reachability detection.

FIGS. 10 and 11 are diagrams illustrating an example of an operation sequence of the reachability detection. It is assumed that the reachability detection is performed among the gateway 10 and the sensor nodes 20-1, 20-2, and 20-3. It is also assumed that the radio operation level is switched to N+1, N, and N−1 in this order.

(Transmission and Reception of Maintenance Mode Frame)

[Step S20a] The gateway 10 broadcasts the maintenance mode frame f0.

[Steps S20b-1, S20b-2, and S20-3] Receiving the maintenance mode frame 10, the sensor nodes 20-1, 20-2, and 20-3 recognize the setting contents in the maintenance mode frame f0. Then, the sensor nodes 20-1, 20-2, and 20-3 switch the radio operation level at the switching time set in the maintenance mode frame f0.

(Reachability Detection at Radio Operation Level N+1)

[Step S30a] The gateway 10 transmits a request signal controlled at a radio operation level of LoRa. For example, the gateway 10 performs an arrival check request for broadcasting within one hop at the radio operation level N+1. In this case, the gateway 10 transmits the identifier of the gateway 10 (assumed to be identifier GW) as the request signal by broadcasting it within one hop at the radio operation level N+1.

[Steps S30b-1, S30b-2, and S30b-3] The sensor nodes 20-1, 20-2, and 20-3 receive the identifier GW and register the identifier GW in their respective slave-side reachability information tables 24.

[Step S31a] As the arrival check response, the sensor node 20-1 transmits the identifier of the sensor node 20-1 (assumed to be identifier n1) as a response signal. In this case, the sensor node 20-1 transmits the identifier n1 by broadcasting the identifier n1 within one hop at the radio operation level N+1.

[Step S31b] The gateway 10 receives the identifier n1 and registers the identifier n1 in the master-side reachability information table 17.

[Steps S31c-2 and S31c-3] The sensor nodes 20-2 and 20-3 receive the identifier n1 and register the identifier n1 in their respective slave-side reachability information tables 24.

[Step S32a] The sensor node 20-2 transmits the identifier of the sensor node 20-2 (assumed to be identifier n2) as the arrival check response. In this case, the sensor node 20-2 transmits the identifier n2 by broadcasting the identifier n2 within one hop at the radio operation level N+1.

[Step S32b] The gateway 10 receives the identifier n2 and registers the identifier n2 in the master-side reachability information table 17.

[Steps S32c-1 and S32c-3] The sensor nodes 20-1 and 20-3 receive the identifier n2 and register the identifier n2 in their respective slave-side reachability information tables 24.

[Step S33a] The sensor node 20-3 transmits the identifier of the sensor node 20-3 (assumed to be identifier n3) as the arrival check response. In this case, the sensor node 20-3 transmits the identifier n3 by broadcasting the identifier n3 within one hop at the radio operation level N+1.

[Step S33b] The gateway 10 receives the identifier n3 and registers the identifier n3 in the master-side reachability information table 17.

[Steps S33c-1 and S33c-2] The sensor nodes 20-1 and 20-2 receive the identifier n3 and register the identifier n3 in their respective slave-side reachability information tables 24.

(Reachability Detection at Radio Operation Level N)

[Step S40a] The gateway 10 performs an arrival check request for broadcasting within two hops at the radio operation level N. In this case, the gateway 10 transmits the identifier GW by broadcasting the identifier GW within two hops at the radio operation level N.

[Steps S40b-1 and S40b-2] The sensor nodes 20-1 and 20-2 receive the identifier GW and register the identifier GW in their respective slave-side reachability information tables 24.

[Step S40c] Assume that the sensor node 20-3 is unable to receive the identifier GW.

[Step S41a] The sensor node 20-1 transmits the identifier n1 as the arrival check response by broadcasting the identifier n1 within two hops at the radio operation level N.

[Step S41b] The gateway 10 receives the identifier n1 and registers the identifier n1 in the master-side reachability information table 17.

[Steps S41c-2 and S41c-3] The sensor nodes 20-2 and 20-3 receive the identifier n1 and register the identifier n1 in their respective slave-side reachability information tables 24.

[Step S42a] The sensor node 20-2 transmits the identifier n2 as the arrival check response by broadcasting the identifier n2 within two hops at the radio operation level N.

[Step S42b] The gateway 10 receives the identifier n2 and registers the identifier n2 in the master-side reachability information table 17.

[Steps S42c-1 and S42c-3] The sensor nodes 20-1 and 20-3 receive the identifier n2 and register the identifier n2 in their respective slave-side reachability information tables 24.

[Step S43a] The sensor node 20-3 transmits the identifier n3 as the arrival check response by broadcasting the identifier n3 within two hops at the radio operation level N.

[Step S43b] Assume that the gateway 10 is unable to receive the identifier n3.

[Steps S43c-1 and S43c-2] The sensor nodes 20-1 and 20-2 receive the identifier n3 and register the identifier n3 in their respective slave-side reachability information tables 24.

(Reachability Detection at Radio Operation Level N−1)

[Step S50a] The gateway 10 performs an arrival check request for broadcasting within three hops at the radio operation level N−1. In this case, the gateway 10 transmits the identifier GW by broadcasting the identifier GW within three hops at the radio operation level N−1.

[Step S50b] The sensor node 20-1 receives the identifier GW and registers the identifier GW in the slave-side reachability information table 24.

[Step S50c] Assume that the sensor nodes 20-2 and 20-3 are unable to receive the identifier GW.

[Step S51a] The sensor node 20-1 transmits the identifier n1 as the arrival check response by broadcasting the identifier n1 within three hops at the radio operation level N−1.

[Step S51b] The gateway 10 receives the identifier n1 and registers the identifier n1 in the master-side reachability information table 17.

[Step S51c] The sensor node 20-2 receives the identifier n1 and registers the identifier n1 in the slave-side reachability information tables 24.

[Step S51d] Assume that the sensor node 20-3 is unable to receive the identifier n1.

[Step S52a] The sensor node 20-2 transmits the identifier n2 as the arrival check response by broadcasting the identifier n2 within three hops at the radio operation level N−1.

[Step S52b] Assume that the gateway 10 is unable to receive the identifier n2.

[Steps S52c-1 and S52c-3] The sensor nodes 20-1 and 20-3 receive the identifier n2 and register the identifier n2 in their respective slave-side reachability information tables 24.

[Step S53a] The sensor node 20-3 transmits the identifier n3 as the arrival check response by broadcasting the identifier n3 within three hops at the radio operation level N−1.

[Step S53b] Assume that the gateway 10 and the sensor node 20-1 are able to receive the identifier n3.

[Step S53c] The sensor node 20-2 receives the identifier n3 and registers the identifier n3 in the slave-side reachability information tables 24.

FIG. 12 is a diagram illustrating a registration example of the reachability information tables. FIG. 12 illustrates the states of the tables in which the registrations have been made according to the sequence illustrated in FIGS. 10 and 11.

In the master-side reachability information table 17 owned by the gateway 10, the gateway 10 has received the identifiers n1, n2, and n3 at the radio operation level N+1 (at S31b, S32b, and S33b in FIG. 10). Thus, the number of arrivals=3, and n1, n2, and n3, which are the identifiers of the sensor nodes 20-1, 20-2, and 20-3, are registered as the reachable nodes.

In addition, at the radio operation level N, the gateway 10 has received the identifiers n1 and n2 (at S41b and S42b in FIG. 11). Thus, the number of arrivals=2, and n1 and n2, which are the identifiers of the sensor nodes 20-1 and 20-2, are registered as the reachable nodes.

Further, at the radio operation level N−1, the gateway 10 has received the identifier n1 (at S51b in FIG. 11). Thus, the number of arrivals=1, and n1, which is the identifier of the sensor node 20-1, is registered as the reachable node.

In the slave-side reachability information table 24-1 owned by the sensor node 20-1, the sensor node 20-1 has received the identifiers GW, n2 and n3 at the radio operation level N+1 (at S30b-1, S32c-1, and S33c-1 in FIG. 10). Thus, the number of arrivals=3, and GW, n2, and n3, which are the identifiers of the gateway 10 and the sensor nodes 20-1 and 20-2, are registered as the reachable nodes.

In addition, at the radio operation level N, the sensor node 20-1 has received the identifiers GW, n2 and n3 (at S40b-1, S42c-1, and S43c-1 in FIG. 11). Thus, the number of arrivals=3, and GW, n2, and n3, which are the identifiers of the gateway 10 and the sensor nodes 20-2 and 20-3, are registered as the reachable nodes.

Further, at the radio operation level N−1, the sensor node 20-1 has received the identifiers GW and n2 (at S50b and S52c-1 in FIG. 11). Thus, the number of arrivals=2, and GW and n2, which are the identifiers of the gateway 10 and the sensor node 20-2, are registered as the reachable nodes.

In the slave-side reachability information table 24-2 owned by the sensor node 20-2, the sensor node 20-2 has received the identifiers GW, n1 and n3 at the radio operation level N+1 (at S30b-2, S31c-2, and S33c-2 in FIG. 10). Thus, the number of arrivals=3, and GW, n1, and n3, which are the identifiers of the gateway 10 and the sensor nodes 20-1 and 20-3, are registered as the reachable nodes.

In addition, at the radio operation level N, the sensor node 20-2 has received the identifiers GW, n1 and n3 (at S40b-2, S41c-2, and S43c-2 in FIG. 11). Thus, the number of arrivals=3, and GW, n1, and n3, which are the identifiers of the gateway 10 and the sensor nodes 20-1 and 20-3, are registered as the reachable nodes.

Further, at the radio operation level N−1, the sensor node 20-2 has received the identifiers n1 and n3 (at S51c and S53c in FIG. 11). Thus, the number of arrivals=2, and n1 and n3, which are the identifiers of the sensor nodes 20-1 and 20-3, are registered as the reachable nodes.

In the slave-side reachability information table 24-3 owned by the sensor node 20-3, the sensor node 20-3 has received the identifiers GW, n1 and n2 at the radio operation level N+1 (at S30b-3, S31c-3, and S32c-3 in FIG. 10). Thus, the number of arrivals=3, and GW, n1, and n2, which are the identifiers of the gateway 10 and the sensor nodes 20-1 and 20-2, are registered as the reachable nodes.

In addition, at the radio operation level N, the sensor node 20-3 has received the identifiers n1 and n2 (at S41c-3 and S42c-3 in FIG. 11). Thus, the number of arrivals=2, and n1 and n2, which are the identifiers of and the sensor nodes 20-1 and 20-2, are registered as the reachable nodes.

Further, at the radio operation level N−1, the sensor node 20-3 has received the identifier n2 (at S52c-3 in FIG. 11). Thus, the number of arrivals=1, and n2, which is the identifier of the sensor node 20-2, is registered as the reachable node.

In this way, since the reachability detection between the gateway 10 and the sensor nodes 20 is performed periodically, it is possible for each node to efficiently detect whether frames are able to reach or not.

Note that for the above reachability detection control, the slave control section 20a in the sensor node 20 has a communication device function of LoRa. Thus, in the case of performing the reachability detection by only changing software, it is possible that the reachability detection is performed based on the number of hops, instead of the radio operation level. For example, control for reachable detection may be performed such that the number of hops is set to a certain value, and that the minimum number of hops within which all the sensor nodes are able to respond is searched for.

<Generation of Distribution Method Candidates>

Next, description is provided for operation to generate distribution method candidates with reference to FIGS. 13 to 17. When the gateway 10 generates frame distribution method candidates, the management apparatus 30 transmits firmware for updating and requirement information to the gateway 10.

The requirement information includes, for example, information on priority level, urgency, and restriction. The requirement information on priority level is information indicating the priority level of firmware update. For example, in the case where it is desired to preferentially update the firmware of the sensor nodes located in a certain area, the priorities of the sensor nodes located in the area is set higher than those of the sensor nodes located in other areas.

The requirement information on urgency is information indicating the urgency of firmware update. For example, for the sensor nodes the firmware of which is desired to be updated for recovery from a trouble, the urgency is set high; for the sensor nodes for which only an ordinary version up is desired, the urgency is set low.

Further, the requirement information on restriction is information indicating temporal restriction on firmware update. For example, for the sensor nodes the firmware of which are desired to be updated within a certain period, a temporal restriction is set.

FIG. 13 is a diagram illustrating an example of requirement information. Table T2 illustrates a specific example of requirement information. The requirement information includes, for example, to complete distribution within L hours, to keep the power consumption of the gateway within M wh/h, to achieve update coverage of P % or more, to prioritize the updates of specific sensor nodes A, B, and C, to minimize the radio interference ratio, and to minimize the distribution time.

The management apparatus 30 refers to the reachability information registered in the master-side reachability information table 17 generated by the gateway 10 to determine requirement information and transmits the determined requirement information to the gateway 10.

Figure 14:
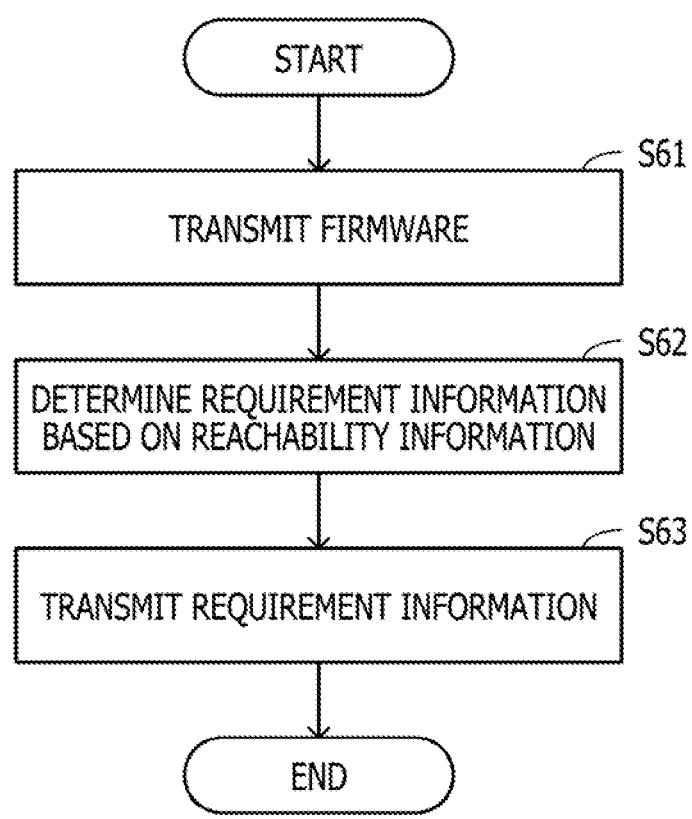
FIG. 14 is a flowchart illustrating operation of a management apparatus.

FIG. 14 is a flowchart illustrating operation of the management apparatus.

[Step S61] The management apparatus 30 transmits data of the firmware for updating to the gateway 10.

[Step S62] The management apparatus 30 refers to the reachability information registered in the master-side reachability information table 17 generated by the gateway 10 to determine requirement information.

[Step S63] The management apparatus 30 transmits the determined requirement information to the gateway 10.

Receiving the firmware, the gateway 10 divides the data of the firmware into pieces and calculates the number of transmission frames for transmitting the data as frames. Then, the gateway 10 calculates its power consumption pace and distribution time corresponding to the number of transmission frames. The gateway 10 registers the calculated number of transmission frames, the power consumption pace, and the distribution time in the resource information table.

FIG. 15 is a diagram illustrating an example of a master-side resource information table. The items of the master-side resource information table 18 includes radio operation level, frame length, the number of transmission frames, distribution interval, the number of hops, power consumption pace, and distribution time.

The frame length is predetermined for each radio operation level. Accordingly, the gateway 10 calculates the number of transmission frames (firmware data length/frame length) for each radio operation level based on the frame length and registers the calculation result in the master-side resource information table 18.

In addition, the gateway 10 calculates a power consumption pace and a distribution time for each radio operation level based on the number of transmission frames, the distribution interval, and the number of hops and registers the calculation results in the master-side resource information table 18. Note that it is assumed that the distribution interval and the number of hops are also predetermined for each radio operation level.

Then, the gateway 10 generates the frame distribution method candidates based on the contents registered in the master-side resource information table 18 and the requirement information transmitted from management apparatus 30.

Here, assume that the contents of the requirement information transmitted from the management apparatus 30 is to complete distribution within 10 hours. In this case, according to the registration contents of the master-side resource information table 18, the distribution time of number 1 is 6 hours; number 2, 3 hours; and number 3, 1.5 hours. Since all methods are capable of completing distribution within 10 hours, numbers 1, 2, and 3 are selected as distribution method candidates.

The gateway 10 estimates the amounts of resource consumption based on the power consumption paces and distribution times in the master-side resource information table 18 and keeps information on the amount of resource consumption to be used for distributing the firmware by each distribution method candidate, associating it with the distribution method candidate. Note that the amount of resource consumption is calculated by (power consumption pace)×(distribution time).

FIG. 16 is a diagram illustrating an example of distribution method candidates. Table T3 illustrates the distribution method candidates generated by the gateway 10 in the above example. The gateway 10 generates three distribution method candidates: broadcasting within one hop at the radio operation level N+1, broadcasting within two hops at the radio operation level N, and broadcasting within three hops at the radio operation level N−1.

Figure 17:
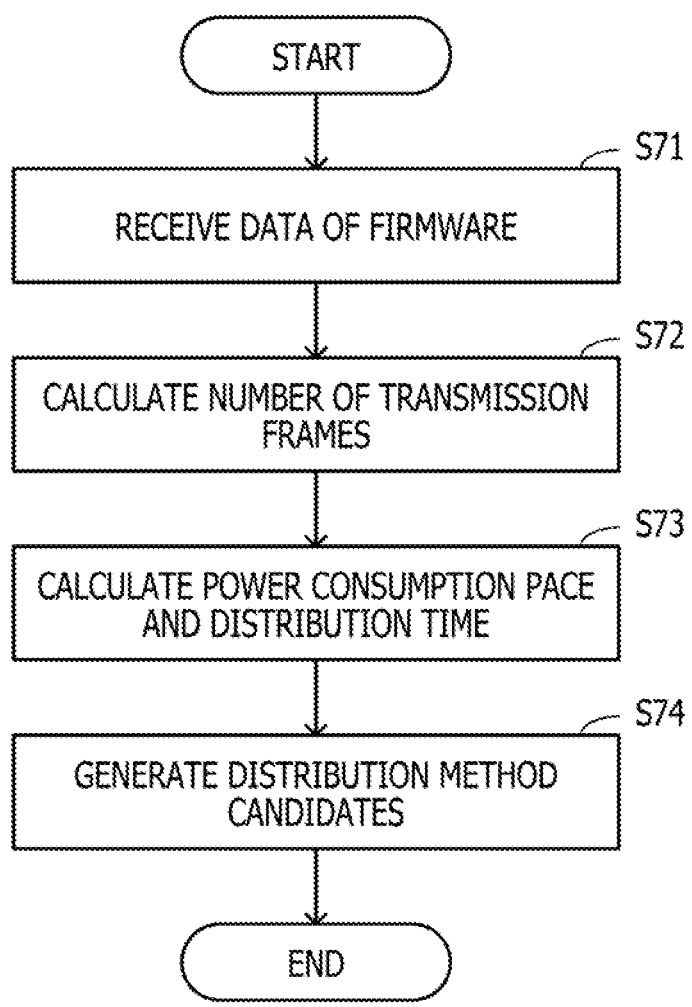
FIG. 17 is a flowchart illustrating operation of generating distribution method candidates.

FIG. 17 is a flowchart illustrating operation of generating distribution method candidates.

[Step S71] The gateway 10 receives data of firmware.

[Step S72] The gateway 10 divides the data length of the firmware by the frame length to calculate the number of transmission frames for each radio operation level, and registers the calculation result in the master-side resource information table 18.

[Step S73] The gateway 10 calculates a power consumption pace and a distribution time for each radio operation level based on the number of transmission frames, the distribution interval, and the number of hops, and the gateway 10 registers the calculation results in the master-side resource information table 18.

[Step S74] The gateway 10 generates distribution method candidates that satisfy the item in the requirement information based on the registration contents in the master-side resource Information table 18. The gateway 10 also estimates the amount of resource consumption for each distribution method candidate and keeps the estimation result in association with the distribution method candidate.

Note that in the case of generating distribution method candidates by only changing, software, the distribution method candidates are generated based on the number of hops. In this case, broadcasting with the number of hops found for the current radio operation level becomes the candidate for the distribution method to be generated.

<Update Feasibility Determination>

Next, description is provided for operation of update feasibility determination with reference to FIGS. 18 to 20. After the gateway 10 generates the distribution method candidates, the gateway 10 notifies the sensor nodes 20 of an update-feasibility inquiry request including information on the distribution method candidates. The sensor nodes 20 check if update by the distribution method candidates is feasible or not.

FIG. 18 is a diagram illustrating an example of a format for the update-feasibility inquiry request. The items of the update-feasibility inquiry request 14a includes update version number, update size, radio operation level, frame length, the number of transmission frames, distribution interval, the number of hops, power consumption pace, and distribution time.

The example of FIG. 18 illustrates the update-feasibility inquiry request corresponding to the distribution method candidate indicated by number 1 in FIG. 15. In this case, the update-feasibility inquiry request is set such that update version number=02, update size=6000 bytes, radio operation level=N+1, frame length=30 bytes, the number of transmission frames=200, distribution interval=10 seconds, the number of hops=1, power consumption pace=20 mW/h, and distribution time=6H.

The sensor node 20, receiving the update-feasibility inquiry request 14a, determines whether it is feasible to update the firmware by the communicated distribution method candidate, based on at least one of the registration contents in the slave-side reachability information table 24 and the registration contents in the slave-side resource information table 25.

FIG. 19 is a diagram illustrating an example of slave-side resource information tables. The sensor node 20 keeps information on its own resources in the slave-side resource information table 25 illustrated in FIG. 6. The example in FIG. 19 illustrates registration contents in the slave-side resource information tables 25-1, 25-2, and 25-3 kept by the sensor nodes 20-1, 20-2, and 20-3, respectively.

The items of the slave-side resource information table 25 includes remaining battery power, operating power consumption, radio operation level, and power generation pace corresponding to the radio operation level.

Here, the sensor node 20 determines the update feasibility, for example, from the following Formula (1).

(the amount of resource consumption)<((remaining battery power)+((power generation pace)−(operating power consumption))×(distribution time))   Formula (1)

If Formula (1) holds, the sensor node 20 determines that it is feasible to update the firmware by the distribution method candidate communicated from the gateway 10; if not, the sensor node 20 determines that the update is infeasible. The update feasibility determination using Formula (1) allows the sensor node 20 to perform firmware update suitable for its own power consumption.

Note that used for the parameters of the amount of resource consumption (=power consumption pace×distribution time) and the distribution time in Formula (1) are values set in the update-feasibility inquiry request 14a. Used for parameters of the remaining battery power, power generation pace, and operating power consumption in Formula (1) are values registered in the slave-side resource information table 25. Note that the right side of Formula (1) represents the amount of expected consumable power including the remaining battery power of the sensor node 20.

FIG. 20 is a diagram illustrating an example of an update-feasibility inquiry response. Receiving the update-feasibility inquiry request 14a, the sensor node 20 determines the update feasibility, then includes the determination result in an update-feasibility inquiry response 22a, and transmits it to the gateway 10.

The items of the update-feasibility inquiry response 22a include update feasibility and condition item. In the update feasibility, if the update is feasible, "feasible" is set; if not, "infeasible" is set. In addition, if the result of update feasibility is "infeasible", and there is a condition for allowing the update, the condition is set in the condition item.

For example, if the update becomes feasible in t hours, "in t hours" is set. In the case where the update is feasible if the distribution interval is M minutes or more, "M minutes of more of distribution interval" is set. Note that if the sensor node 20 is unable to update the firmware automatically, a condition that updating has to be performed by an operator may be set to the condition item.

<Selection of Distribution Method>

Next, operation to select a distribution method is described. The gateway 10 summarizes the update-feasibility inquiry responses 22a transmitted from the sensor nodes 20 to generate the update-feasibility inquiry response table 19 illustrated in FIG. 5.

FIG. 21 is a diagram illustrating an example of an update-feasibility inquiry response table. The update-feasibility inquiry response table 19 is a summary made by organizing the update-feasibility inquiry responses 22a transmitted from the sensor nodes 20 for each distribution method candidate.

In the example in FIG. 21, in table 19a, the sensor node 20-1 is able to perform the update by the distribution method candidate #1, and the sensor nodes 20-2 and 20-3 are unable to perform the update by the distribution method candidate #1. Note that table 19a indicates that the sensor node 20-2 is able to perform the update by the distribution method candidate #1 if the update occurs in one hour.

In table 19b, the sensor nodes 20-1 and 20-3 are able to perform the update by the distribution method candidate #2, and the sensor node 20-2 is unable to perform the update by the distribution method candidate #2. Note that table 19b indicates that the sensor node 20-2 is able to perform the update by the distribution method candidate #2 if the update occurs in two hours.

In table 19c, the sensor nodes 20-1 and 20-3 are able to perform the update by the distribution method candidate #3, and the sensor node 20-2 is unable to perform the update by the distribution method candidate #3. Note that table 19c indicates that the sensor node 20-2 is able to perform the update by the distribution method candidate #3 if the update occurs in three hours.

The gateway 10 summarizes the update-feasibility inquiry responses 22a transmitted from the sensor nodes to generate the update-feasibility inquiry response table 19 as described above and then transmits the summary to the management apparatus 30. If there is the latest requirement information based on the contents of the update-feasibility inquiry response table 19, which is the result of the summary, the management apparatus 30 transmits the latest requirement information to the gateway 10.

The gateway 10 selects a distribution method out of the distribution method candidates based on the update-feasibility inquiry response table 19 and the latest requirement information transmitted from the management apparatus 30 and transmits the frames by the selected distribution method. In this case, after executing instructions that make the update feasible, the gateway 10 distributes the frames by the selected distribution method.

For example, if the gateway 10 selects the distribution method candidate #2 out of the distribution method candidates #1, #2, and #3, the gateway 10 distributes the frames in two hours by the method of the distribution method candidate #2 (broadcasting within two hops at the radio operation level N).

Note that since when the number of hops is large, the occurrence probability of interference is high; if there are multiple distribution method candidates that satisfy the requests in selecting a distribution method, a distribution method candidate in which the number of hops is small is preferentially selected to reduce the interference. Meanwhile, if the gateway 10 is unable to apply the condition for allowing the update, the gateway 10 excludes the concerned sensor node from the sensor nodes to be updated when distributing the frames. When the update starts, the concerned sensor node autonomously enters a sleep state with time limit.

<Action Taken if Un-Updated Sensor Node Exists>

There is a case where sensor nodes that were unable to be updated due to factors such as frame losses exist after the frame distribution is executed. In this case, the gateway 10 detects un-updated sensor nodes based on information such as firmware version information communicated periodically from the sensor nodes to the gateway 10.

Then, the gateway 10 makes an update request (update instruction) to updated sensor nodes near the un-updated sensor nodes to update the un-updated sensor nodes. The updated sensor node that has received the update request updates the un-updated sensor node by transmitting the frames for un-updated parts.

Alternatively; an un-updated sensor node itself may make an update request to nearby updated sensor nodes. It is possible that an updated sensor node that has received the update request updates the un-updated sensor node by transmitting the frames for un-updated parts.

In this way, if there is a case where an un-updated sensor node exists, the frames for the un-updated parts are distributed to the un-updated sensor node, using an updated sensor node located near the un-updated sensor node. This makes it possible to provide the un-updated sensor node with the un-updated parts of the firmware.

<Update of Sensor Node with Condition to be Fulfilled to Make Update Feasible>

Next, description is provided for update of a sensor node with a condition to be fulfilled to make the update feasible, with reference to FIGS. 22 and 23 (in the following description, the identifier of a sensor node is used as a symbol to indicate the sensor node).

Figure 22:
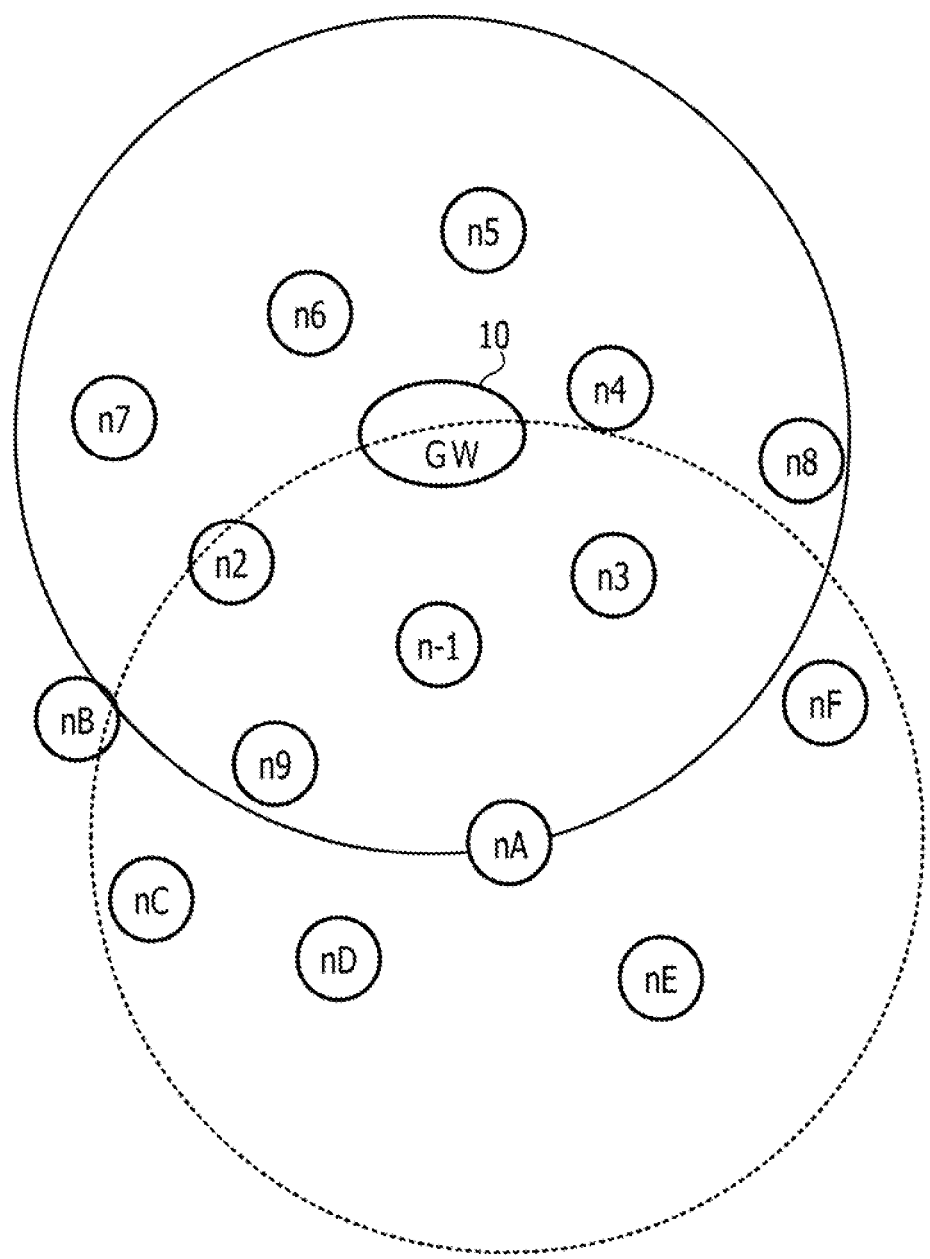
FIG. 22 is a diagram illustrating a broadcast range from a gateway.

FIG. 22 is a diagram illustrating a broadcast range from a gateway. It is assumed that the gateway 10 was able to update the firmware of sensor nodes n1 to n9, and nA by transmitting frames at the radio operation level N. It is also assumed that the gateway 10 was unable to update the firmware of sensor nodes nB, nC, nD, nE, and nF.

FIG. 23 is a diagram illustrating an example of an update-feasibility inquiry response table. In the update-feasibility inquiry response table 19-1, the sensor nodes n1 to n9, and nA are able to be updated by broadcasting within one hop at the radio operation level N. On the other hand, the sensor nodes nB, nC, nD, nE, and nF are conditionally updatable.

In other words, the sensor node nB is unable to be updated by the gateway 10 broadcasting within one hop at the radio operation level N, but the sensor node nB is updatable if the frames are transmitted from a nearby sensor node nA, n1, n2, n7, n9, nC, or nD.

The sensor node nC is unable to be updated by the gateway 10 broadcasting within one hop at the radio operation level N, but the sensor node nC is updatable if the frames are transmitted from a nearby sensor node nA, n1, n2, n9, nB, or nD.

The sensor node nD is unable to be updated by the gateway 10 broadcasting within one hop at the radio operation level N, but the sensor node nD is updatable if the frames are transmitted from a nearby sensor node nA, n1, n2, n9, nB, or nC.

The sensor node nE is unable to be updated by the gateway 10 broadcasting within one hop at the radio operation level N, but the sensor node nE is updatable if the frames are transmitted from a nearby sensor node nA, n3, n9, nD, or nF.

The sensor node nF is unable to be updated by the gateway 10 broadcasting within one hop at the radio operation level N, but the sensor node nF is updatable if the frames are transmitted from a nearby sensor node nA, n1, n3, n4, n8, or nE.

Update of the sensor nodes nB, nC, nD, nE, and nF, which are updatable under the conditions described above, is performed under the following control.

(Update Control Example 1)

After broadcasting within one hop at the radio operation level N, the gateway 10 detects a common sensor node out of the sensor nodes that appear in the condition items in the update-feasibility inquiry response table 19-1, which is the sensor node nA. Then, the gateway 10 transmits to the sensor node nA an instruction to broadcast within one hop at the radio operation level N, and the sensor node nA distributes the frames.

(Update Control Example 2)

The gateway 10 notifies the sensor nodes nB, nC, nD, nE, and nF of the identifiers of the sensor nodes that have completed the update with the broadcasting within one hop at the radio operation level N+1 or N+2. Then, the sensor nodes nB, nC, nD, nE, and nF transmit an update request autonomously to the updated sensor nodes and perform update using the frames distributed from the updated sensor nodes.

<Frame Distribution Based on Update Efficacy Value>

Next, description is provided for frame distribution operation based on update efficacy values. The update efficacy value is an index used when selecting a frame distribution method, and a frame distribution method with a higher update efficacy value is selected.

(Procedural step 1) When the sensor node receives a maintenance mode frame transmitted from the gateway 10, the sensor node switches the radio operation level to perform maintenance mode communication. The gateway 10 makes an update-feasibility inquiry to the sensor nodes to detect updatable sensor nodes.

Note that the gateway 10 performs reachability detections periodically during spare time in operation. In addition, the gateway 10 broadcasts the update-feasibility inquiry request including information such as the update version, size, and distribution method candidates.

(Procedural step 2) The sensor node calculates its remaining battery power and the amount of past demand/supply and determines whether it is feasible to update the firmware by the received distribution method candidates, and then the sensor node transmits the determination result to the gateway 10. Note that as for the remaining battery power, the battery power to be used for transmission and reception is calculated from the firmware size, frame size, radio operation level, and distribution method.

For example, the remaining battery power used for transmission and reception is calculated as follows. Assume that the firmware size=1000 bytes, 1 frame size=10 bytes, the radio operation level=N+5, the distribution method=broadcasting within one hop, and power consumption per transmission=10 mWh. In this case, the following Formula (2) is used for the calculation.

$$\text{(Remaining batter power used for transmission and reception)} = 1000 \text{ bytes}/10 \text{ bytes} \times 10 \text{ mWh} \times (\text{once}) = 1000 \text{ mWh} \quad (2)$$

Note that "once" in Formula (2) is set in consideration of remaining battery power used for reception because relay transmission does not occur in the case of broadcasting within one hop.

(Procedural step 3) The gateway 10 calculates expected time of distribution completion for the case of distributing the frames by each distribution method candidate. The expected time of distribution completion is calculated by, for example, the following Formula (3).

$$\text{(expected time of distribution completion)} = \text{(the number of transmission frames)} \times \text{(frame transmission interval)} + \text{(frame transmission start time)} \quad (3)$$

(Procedural step 4) The management apparatus 30 sets efficacy criteria for firmware update (including, for example, completion within the set period, power consumption, cost, time, and certainty), and the gateway 10 calculates the update efficacy value for each distribution method candidate to select and execute a distribution method having a high efficacy value.

As for calculation of the update efficacy value, assuming that, for example, 100 is the best value, the radio operation levels are compared in terms of completion within the set period and, how small the power consumption is, and the best one is selected.

Figure 24:
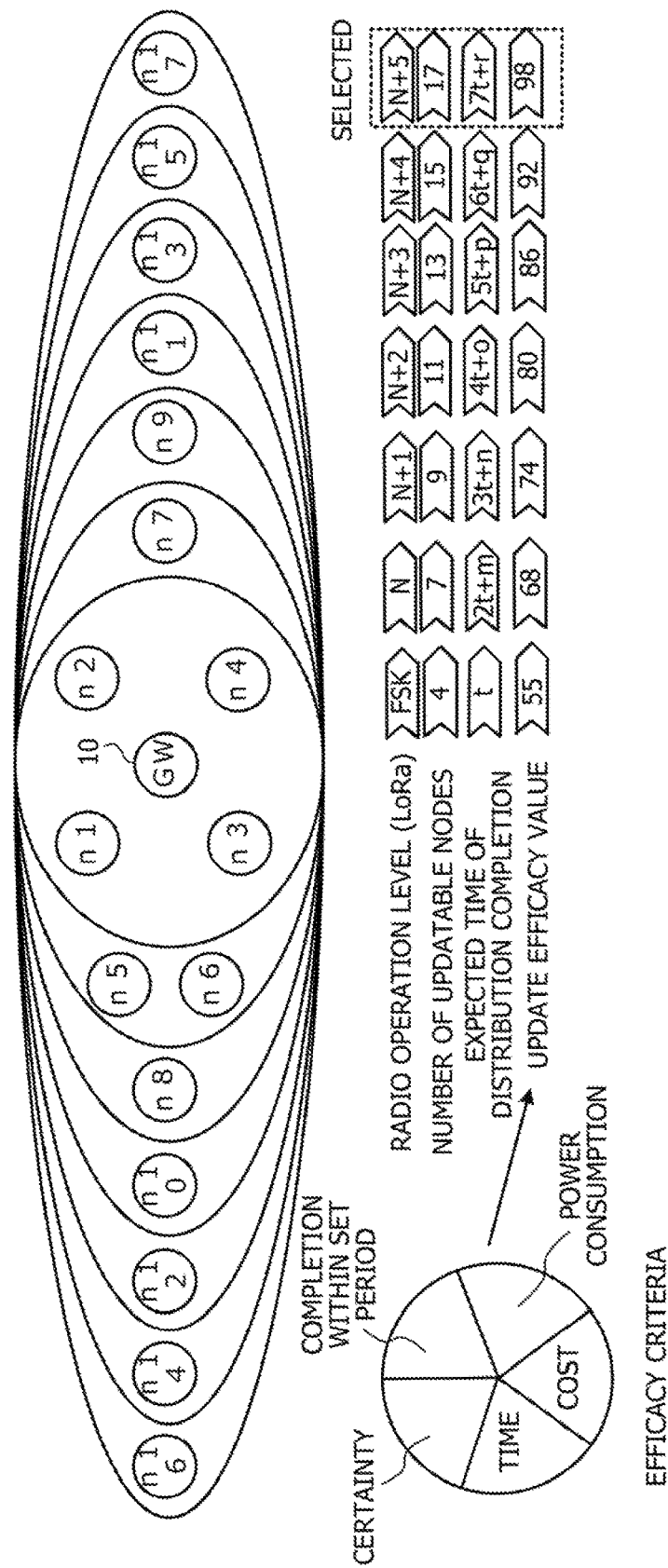
FIG. 24 is a diagram illustrating operation to select a distribution method, based on update efficacy values.

FIG. 24 is a diagram illustrating operation to select a distribution method based on the update efficacy value. A communication system 1-2 includes a gateway 10 and sensor nodes n1 to n17. Note that radio operation level is a level at which communication by LoRa is performed.

The sensor nodes n1 to n4 are located within a range in which the radio operation level from the gateway 10 is frequency shifting keying (FSK). Thus, for the gateway 10, the number of updatable nodes within the range in which the radio operation level is up to FSK is four.

The gateway 10 has calculated the expected time of distribution completion to distribute firmware to the sensor node n1 to n4 as t, and the update efficacy value as 55. The sensor nodes n5, n6, and n7 are located within a range in which the radio operation level from the gateway 10 is N. Thus, for the gateway 10, the number of updatable nodes within the range in which the radio operation level is up to N is 7, including the sensor nodes n1 to n4.

The gateway 10 has calculated the expected time of distribution completion to distribute firmware to the sensor nodes n1 to n7 as 2t+m, and the update efficacy value as 68.

The sensor nodes n8 and n9 are located within a range in which the radio operation level from the gateway 10 is N+1. Thus, for the gateway 10, the number of updatable nodes within the range in which the radio operation level is up to N+1 is 9, including the sensor nodes n1 to n7.

The gateway 10 has calculated the expected time of distribution completion to distribute firmware to the sensor node n1 to n9 as 3t+n, and the update efficacy value as 74.

The sensor nodes n10 and n11 are located within a range in which the radio operation level from the gateway 10 is N+2. Thus, for the gateway 10, the number of updatable nodes within the range in which the radio operation level is up to N+2 is 11, including the sensor nodes n1 to n9.

The gateway 10 has calculated the expected time of distribution completion to distribute firmware to the sensor node n1 to n11 as 4t+o, and the update efficacy value as 80.

The sensor nodes n12 and n13 are located within a range in which the radio operation level from the gateway 10 is N+3. Thus, for the gateway 10, the number of updatable nodes within the range in which the radio operation level is up to N+3 is 13, including the sensor nodes n1 to n11.

The gateway 10 has calculated the expected time of distribution completion to distribute firmware to the sensor node n1 to n13 as 5t+p, and the update efficacy value as 86.

The sensor node n14 and n15 are located within a range in which the radio operation level from the gateway 10 is N+4. Thus, for the gateway 10, the number of updatable nodes within the range in which the radio operation level is up to N+4 is 15, including the sensor nodes n1 to n13.

The gateway 10 has calculated the expected time of distribution completion to distribute firmware to the sensor nodes n1 to n15 as 6t+q, and the update efficacy value as 92.

The sensor nodes n16 and n17 are located within a range in which the radio operation level from the gateway 10 is N+5. Thus, for the gateway 10, the number of updatable nodes within the range in which the radio operation level is up to N+5 is 17, including the sensor nodes n1 to n15.

The gateway 10 has calculated the expected time of distribution completion to distribute firmware to the sensor node n1 to n17 as 7t+r, and the update efficacy value as 98.

Thus, in the communication system 1-2, since 98 is the highest update efficacy value, the frame distribution at the radio operation level N+5 is selected and executed.

As has been described, according to the present disclosure, since frame distribution method candidates are generated based on the reachability from the gateway to the sensor nodes and the number of transmission frames, and a distribution method by which the nodes are updatable is selected out of the candidates; it is possible to distribute frames for updating without hindering the operation. In addition, the frame distribution in consideration of both transmission and reception sides allows long term operation. The present disclosure reduces multi-hop flooding, reducing radio interference, making it possible to improve reachability. Further, the present disclosure makes it possible to update firmware in accordance with the request from the management apparatus.

The foregoing processing functions of the master node and slave node as well as the gateway and sensor node according to the present disclosure may be implemented by a computer. In this case, processing contents of functions that the master node and slave node as well as the gateway and sensor node are desired to have are written in a program, and the program is provided. The program is executed by a computer, so that those processing functions are implemented on the computer.

The program in which processing contents are written may be recorded in a computer readable medium. Examples of the computer readable recording medium include a magnetic storage apparatus, optical disk, magneto-optical recording medium, and semiconductor memory. Examples of the magnetic storage apparatus include a hard disk drive (HDD), flexible disk (FD), and magnetic tape. Examples of the optical disk includes DVD, DVD-RAM, and CD-ROM/RW. Examples of the magneto-optical recording medium include magneto optical disk (MO).

In the case of distributing the program, for example, portable recording media such as DVD and CD-ROM, in which the program is recorded, are sold. Alternatively, the program stored in a storage apparatus, such as a server computer, may be transferred via a network from the server computer to another computer.

A computer that executes the program, for example, stores the program recorded in a portable recording medium or the program transferred from a server computer into its own storage apparatus. Then, the computer reads the program from the own storage apparatus and executes processing according to the program. Note that the computer may read the program directly from the portable recording medium to execute processing according to the program.

Moreover, every time a program is transferred to the computer from a server computer that the computer is coupled to via a network, the computer may execute processing according to the received program sequentially.

Alternatively, at least part of the above processing functions may be implemented with an electronic circuit, such as DSP, ASIC, and PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
a first node including a first memory and a first processor coupled to the first memory; and
a second node including a second memory and a second processor coupled to the second memory, wherein
the first processor is configured to:
obtain first information indicating reachability of data to the second node in a case of transmitting the data to the second node;
specify a number of frames in a case of transmitting, to the second node, a file to be used for updating of software at the second node;
specify, based on the first information and the number of frames, a transmission method candidate to transmit the file from the first node to the second node; and
notify the second node of the specified transmission method candidate,
the second processor is configured to:
generate updating information indicating whether the software can be updated based on the file to be transmitted by the transmission method candidate; and
notify the first node of the updating information, the first processor is configured to:
specify a transmission method of the file from the transmission method candidate, based on the updating information; and
transmit the file to the second node by using the specified transmission method, and
the second processor is configured to execute the updating of the software by using the file transmitted from the first node.

2. The communication system according to claim 1, wherein
the first node and the second node are coupled to each other with wireless communication,
the first processor is configured to transmit a request signal for each operation levels of the wireless communication,
the second processor is configured to transmit a response signal to the request signal, and
the first processor is configured to specify the first information for each operation levels, based on the response signal.

3. The communication system according to claim 2, wherein
the first processor is configured to transmit the request signal controlled in accordance with Long Range (LoRa) for each of the operation levels.

4. The communication system according to claim 2, wherein
the first processor is configured to:
specify a resource to be used for transmission of the file, based on the first information and the number of frames;
specify the transmission method candidate that allows the transmission with the resource satisfying a requirement requested from a system management apparatus; and
transmit, to the second node, an update-feasibility inquiry request including resource information indicating the resource and the transmission method candidate.

5. The communication system according to claim 4, wherein
the requirement includes at least one of an update coverage of the second node, a priority level of the second node to be updated, and a temporal restriction on transmission of the frames.

6. The communication system according to claim 4, wherein
the second processor is configured to:
based on the update-feasibility inquiry request, determine that the updating is feasible when the amount of expected consumable power including remaining battery power of the second node is greater than the amount of power to be consumed by the resource, and determine that the update is infeasible when the amount of expected consumable power is equal to or less than the amount of power to be consumed by the resource.

7. The communication system according to claim 6, wherein
the second processor is configured to cancel reception of the file when the second processor determines that the updating is infeasible.

8. The communication system according to claim 1, further comprising:
a third node, wherein
the first processor is configured to output an updating instruction to the second node that has completed the update when the first processor detects that the updating is not completed by the third node, and
the second processor is configured to transmit the file to the third node, based on the updating instruction.

9. The communication system according to claim 1, further comprising
a fourth node, wherein
the second processor is configured to receive the frames transmitted from the fourth node that has completed the update when the updating is not completed by the second node.

10. A method executed by a first node and a second node, the method comprising:
obtaining, by the first node, first information indicating reachability of data to the second node in a case of transmitting the data to the second node;
specifying, by the first node, a number of frames in a case of transmitting, to the second node, a file to be used for updating of software at the second node;
specifying, by the first node, based on the first information and the number of frames, a transmission method candidate to transmit the file from the first node to the second node;
notifying, by the first node, the second node of the specified transmission method candidate;

generating, by the second node, updating information indicating whether the software can be updated based on the file to be transmitted by the transmission method candidate;

notifying, by the second node, the first node of the updating information;

specifying, by the first node, a transmission method of the file from the transmission method candidate, based on the updating information; and transmitting, by the first node, the file to the second node by using the specified transmission method; and executing, by the second node, the updating of the software by using the file transmitted from the first node.

11. The method according to claim 10, wherein the first node and the second node are coupled to each other with wireless communication, and the method further comprises:

transmitting, by the first node, a request signal for each operation levels of the wireless communication;

transmitting, by the second node, a response signal to the request signal; and specifying, by the first node, the first information for each operation levels, based on the response signal.

12. The method according to claim 11, further comprises:

transmitting, by the first node, the request signal controlled in accordance with Long Range (LoRa) for each of the operation levels.

13. The method according to claim 11, further comprises:

specifying, by the first node, a resource to be used for transmission of the file, based on the first information and the number of frames;

specifying, by the second node, the transmission method candidate that allows the transmission with the resource satisfying a requirement requested from a system management apparatus; and transmitting, by the second node, to the second node, an update-feasibility inquiry request including resource information indicating the resource and the transmission method candidate.

14. The method according to claim 13, wherein the requirement includes at least one of an update coverage of the second node, a priority level of the second node to be updated, and a temporal restriction on transmission of the frames.

15. The method according to claim 13, further comprising:

based on the update-feasibility inquiry request, determining, by the second node, that the updating is feasible when the amount of expected consumable power including remaining battery power of the second node is greater than the amount of power to be consumed by the resource, and determining, by the second node, that the update is infeasible when the amount of expected consumable power is equal to or less than the amount of power to be consumed by the resource.

16. The method according to claim 15, further comprising:

cancelling, by the second node, reception of the file when the second processor determines that the updating is infeasible.

17. The method according to claim 10, further comprising:

outputting, by the first node, an updating instruction to the second node that has completed the update when the first processor detects that the updating is not completed by a third node; and transmitting, by the second node, the file to the third node, based on the updating instruction.

18. The method according to claim 10, further comprising receiving, by the second node, the frames transmitted from a fourth node that has completed the update when the updating is not completed by the second node.

* * * * *